US012327697B2

(12) United States Patent
Li

(10) Patent No.: US 12,327,697 B2
(45) Date of Patent: Jun. 10, 2025

(54) KEYBOARD AND ELECTRONIC DEVICE

(71) Applicant: Honor Device Co., Ltd., Guangdong (CN)

(72) Inventor: Haitao Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/252,430

(22) PCT Filed: Sep. 9, 2022

(86) PCT No.: PCT/CN2022/118089
§ 371 (c)(1),
(2) Date: May 10, 2023

(87) PCT Pub. No.: WO2023/077960
PCT Pub. Date: May 11, 2023

(65) Prior Publication Data
US 2024/0339271 A1 Oct. 10, 2024

(30) Foreign Application Priority Data
Nov. 2, 2021 (CN) .......................... 202111289702.2

(51) Int. Cl.
*H01H 13/14* (2006.01)
*H01H 13/70* (2006.01)
(52) U.S. Cl.
CPC ............ *H01H 13/14* (2013.01); *H01H 13/70* (2013.01)
(58) Field of Classification Search
CPC ....... H01H 2203/052; H01H 2203/058; H01H 2211/024; H01H 2217/004; H01H 2219/036; H01H 2219/046; H01H 2219/054; H01H 2221/088; H01H 13/00; H01H 13/14; H01H 13/02; H01H 13/26; H01H 13/50; H01H 13/52; H01H 13/70; H01H 13/7006; H01H 13/702;
(Continued)

(56) References Cited

U.S. PATENT DOCUMENTS 5,829,579 A 11/1998 Tsai
6,776,547 B1 8/2004 Dubois et al.
(Continued)

FOREIGN PATENT DOCUMENTS

CN 101728104 B 11/2011
CN 103151206 A 6/2013
(Continued)

*Primary Examiner* — Anthony R Jimenez

(57) ABSTRACT

Embodiments of this application provide a keyboard and an electronic device. According to the keyboard provided in the embodiments of this application, a distance between a second key and a substrate is increased by providing a groove for mounting the second key in the substrate. In addition, in a case that distances between first electrical contacts of keys and corresponding second electrical contacts are consistent, a depth of the groove is designed to be greater than a maximum deformation deflection of the second key, so that even if a corner end of the second key is bent and deformed under a pressure, a minimum distance between the second key and the substrate can still be greater than the distance between the first electrical contact of the second key and the corresponding second electrical contact.

16 Claims, 14 Drawing Sheets

(58) Field of Classification Search
CPC ........... H01H 2003/00; H01H 2003/02; H01H 2003/12; H01H 2013/00; H01H 2013/02; H01H 2013/023; H01H 2013/50; H01H 2013/525; H01H 3/00; H01H 3/02; H01H 3/0253; H01H 3/12; H01H 3/122; H01H 3/125; H05K 1/14; H05K 1/183; H05K 2201/05; H05K 2201/09145; H05K 2201/09154; H05K 2201/2209
USPC ........................................................ 200/341
See application file for complete search history.

(56) References Cited

U.S. PATENT DOCUMENTS

| | | | |
|---|---|---|---|
| 8,987,617 B2 | 3/2015 | Wang et al. | |
| 2016/0268073 A1 | 9/2016 | Huang | |
| 2024/0172367 A1* | 5/2024 | Zhang | H05K 3/3452 |

FOREIGN PATENT DOCUMENTS

| | | |
|---|---|---|
| CN | 103811216 A | 5/2014 |
| CN | 104679273 A | 6/2015 |
| CN | 204720358 U | 10/2015 |
| CN | 109859977 A | 6/2019 |
| CN | 111292989 A | 6/2020 |
| CN | 212907504 U | 4/2021 |
| CN | 212967486 U | 4/2021 |
| CN | 213025901 U | 4/2021 |
| JP | 2005005263 A | 1/2005 |
| JP | 2021096894 A | 6/2021 |

\* cited by examiner

KEYBOARD AND ELECTRONIC DEVICE

CROSS-REFERENCE TO RELATED APPLICATIONS

This application is a national stage of International Application No. PCT/CN2022/118089, filed on Sep. 9, 2022, which claims priority to Chinese Patent Application No. 202111289702.2, filed on Nov. 2, 2021, both of which are incorporated herein by reference in their entireties.

TECHNICAL FIELD

Embodiments of this application relate to the field of terminal technology, and in particular, to a keyboard and an electronic device.

BACKGROUND

Because of the convenience and powerful data processing capability of a laptop (Laptop), the laptop has become an important office tool in daily life. Among hardware devices of the laptop, a keyboard (Key Board) is one of the important input ports, and the performance of the keyboard greatly affects user experience.

Currently, the keyboard of the laptop usually includes a variety of keys such as alphabetical keys, numeric keys, and function keys. The lengths of keys such as a spacebar key and a shift key in the function keys are greater than the lengths of other keys. Each key is retractably arranged on a substrate of the keyboard by an elastic member, and the elastic member is located in the middle of each key. In addition, a first electrical contact is arranged on the elastic member, and a second electrical contact right opposite to the first electrical contact is arranged on the substrate. When the key is pressed, the first electrical contact and the second electrical contact are in contact and in conduction, thereby implementing an input.

However, when a pressure is applied to a corner end of a key with a large length, for example, a spacebar key or a shift key, to perform an input, the foregoing input action may be invalid, which affects the input efficiency.

SUMMARY

Embodiments of this application provide a keyboard and an electronic device, which can solve a problem in the related art that an input may fail when a corner end of a key with a large length is pressed, which affects the input efficiency.

According to a first aspect of the embodiments of this application, a keyboard is provided. The keyboard includes: a substrate, a plurality of first keys, and at least one second key, where the first keys and the second key are all retractably arranged on the substrate, a length of the second key is greater than a length of each first key, and a groove for each second key to extend into when being pressed is provided in the substrate at a position right opposite to the second key; and when the first key and the second key are in an initial state, a vertical distance between the second key and a groove bottom of the groove is greater than a vertical distance between the first key and the substrate, and a depth of the groove is greater than or equal to a maximum deformation deflection of the second key.

For the keyboard provided in the embodiments of this application, a distance between a second key and a substrate is increased by providing a groove for mounting the second key in the substrate. In addition, in a case that a distance between a first electrical contact of the second key and a corresponding second electrical contact is consistent with a distance between a first electrical contact of a first key and a corresponding second electrical contact, a depth of the groove is designed to be greater than a maximum deformation deflection of the second key, so that even if a corner end of the second key is bent and deformed under a pressure, a minimum distance between the second key and the substrate can still be greater than the distance between the first electrical contact of the second key and the corresponding second electrical contact. Before the second key continues to be pressed to touch a groove bottom of the groove, the first electrical contact of the second key and the corresponding second electrical contact are in contact to enable the second key to implement an input successfully, thereby reducing the impact of an invalid input on input efficiency.

In a possible implementation, each first key includes a first key cap, each second key includes a second key cap, and a length of the second key cap is greater than a length of the first key cap;

the second key cap is opposite to the groove, and an orthographic projection area of the second key cap towards the groove is smaller than a notch area of the groove, to allow the second key cap to extend into the groove when being pressed; and a vertical distance between the second key cap and the groove bottom of the groove is greater than a vertical distance between the first key cap and the substrate.

In a possible implementation, the keyboard further includes: a bottom plate, connected to the substrate, where the bottom plate is located on one side of the substrate, and the first key and the second key are located on an other side of the substrate.

In a possible implementation, the substrate includes a first surface and a second surface facing away from the first surface, the groove is provided in the first surface, and a distance between the groove bottom of the groove and the second surface is less than a distance between the first surface and the second surface; and the bottom plate is connected to the second surface of the substrate.

In a possible implementation, the substrate includes a body portion and a recess portion connected to the body portion and protruding toward the bottom plate, and an inner wall of the recess portion defines the groove; and an accommodating groove is provided in the bottom plate, and the recess portion is located in the accommodating groove.

In a possible implementation, a surface of the bottom plate facing away from the substrate is a plane, and a thickness of the bottom plate at the accommodating groove is less than a thickness of a position of the bottom plate corresponding to the body portion.

In a possible implementation, the bottom plate includes a flat plate portion and a protruding portion that are connected, the protruding portion protrudes in a direction away from the substrate, and the flat plate portion and the protruding portion jointly define the accommodating groove.

In a possible implementation, the recess portion includes a first bearing plate and a connecting plate, an opening is provided in the body portion, one end of the connecting plate is connected to an inner wall of the opening, and an other end of the connecting plate extends in a direction toward the bottom plate and is connected to the first bearing plate; and the protruding portion includes a second bearing plate and a connecting rib, the connecting rib is arranged at a circumferential edge of the second bearing plate, and the connecting rib extends toward the flat plate portion and is connected to the flat plate portion.

In a possible implementation, the connecting rib is inclined to a surface of the flat plate portion facing the substrate, and a groove bottom area of the accommodating groove is smaller than a notch area of the accommodating groove.

In a possible implementation, a plurality of connecting ribs are provided, and the plurality of connecting ribs are spaced apart around the circumferential edge of the second bearing plate; a plurality of connecting plates are provided, and the plurality of connecting plates are spaced apart along a circumferential edge of the first bearing plate; and each connecting plate is located between two adjacent connecting ribs; or the connecting plate is inclined to a first surface of the substrate, a vertical projection area of the first bearing plate toward the second bearing plate is smaller than a cross-sectional area of the second bearing plate in a vertical direction, and each connecting plate is located on a side of the connecting rib facing the second key.

In a possible implementation, the substrate further includes a flexible circuit board, the opening is provided at an edge position of the body portion, the flexible circuit board is connected to an edge of a side in which the opening in the body portion is located, and the body portion is electrically connected to the recess portion by the flexible circuit board.

In a possible implementation, a protective film is further included, and the protective film is attached to a surface of the bottom plate facing away from the substrate.

In a possible implementation, a groove depth of the groove is greater than or equal to 0.15 mm and less than or equal to 0.255 mm.

In a possible implementation, at least one balance bar is further included, where the balance bar is arranged between the second key cap and the substrate; and assembly grooves corresponding to both ends of the balance bar are provided in the bottom plate, and avoidance openings for avoiding the assembly grooves are provided in the substrate, both ends of each balance bar are respectively rotatably connected to the assembly grooves, and the balance bar is rotatably connected to the second key cap.

In a possible implementation, a first elastic member and a second elastic member are further included, and a height of the first elastic member is less than a height of the second elastic member; both ends of the first elastic member respectively abut against the substrate and the first key cap, and the first key cap is retractably arranged on the substrate by the first elastic member; and both ends of the second elastic member respectively abut against the groove bottom of the groove and the second key cap, and the second key cap is retractably arranged on the substrate by the second elastic member.

According to a second aspect of the embodiments of this application, an electronic device is provided. The electronic device includes: the keyboard provided in the first aspect of the embodiments of this application.

The electronic device provided in the embodiments of this application includes a keyboard. In the keyboard, a distance between a second key and a substrate is increased by providing a groove for mounting the second key in the substrate. In addition, in a case that a distance between a first electrical contact of the second key and a corresponding second electrical contact is consistent with a distance between a first electrical contact of a first key and a corresponding second electrical contact, a depth of the groove is designed to be greater than a maximum deformation deflection of the second key, so that even if a corner end of the second key is bent and deformed under a pressure, a minimum distance between the second key and the substrate can still be greater than the distance between the first electrical contact of the second key and the corresponding second electrical contact. Before the second key continues to be pressed to touch a groove bottom of the groove, the contacts are in contact to enable the second key to implement an input successfully, thereby reducing the impact of an invalid input on input efficiency.

DESCRIPTIONS OF NUMERALS IN THE DRAWINGS

100. electronic device;
10. display screen;
20. main unit;
30. tablet computer;

40. keyboard;
41. substrate;
410. groove; 411. body portion; 412. recess portion; 4120. first bearing plate; 4121. connecting plate; 4122. first opening; 4123. second opening; 4124. avoidance opening; 413. flexible circuit board;
42. bottom plate;
420. accommodating groove; 421. flat plate portion; 422. protruding portion; 4220. second bearing plate; 4221. connecting rib; 4222. gap; 4223. first hook; 4224. second hook; 4225. assembly groove;
43. first key;
430. first key cap; 431. first scissor foot; 432. first elastic member; 4320. first mounting groove;
44. second key;
440. second key cap; 441. second scissor foot; 4410. outer scissor foot; 4411. inner scissor foot;
442. second elastic member; 4420. second mounting groove;
45. protective film;
46. first electrical contact;
47. second electrical contact; and
48. balance bar.

DESCRIPTION OF EMBODIMENTS

Figure 1:
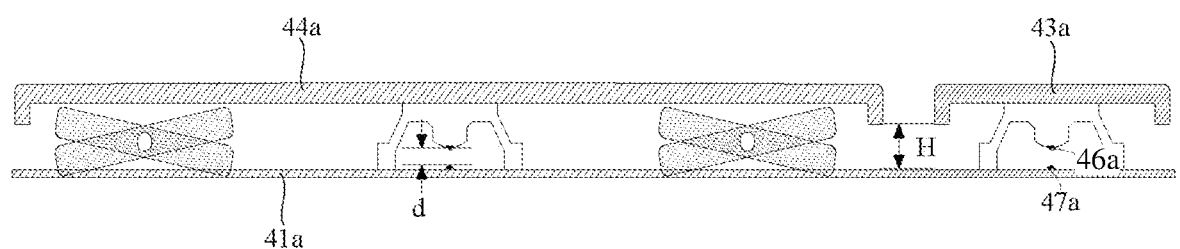
FIG. 1 is a cross-sectional view of some keys of a keyboard in the related art.

FIG. 1 schematically shows a partial structure of a keyboard in the related art. The keyboard in the related art includes a substrate 41a and a variety of keys 43a, 44a. As shown in FIG. 1, each key 43a, 44a is retractably arranged on the substrate 41a by an elastic member, and the elastic member is in contact with the middle of the key 43a, 44a. It may be understood that retracting distances of the keys 43a, 44a are equal, and the retracting distances h of the keys 43a, 44a are less than a minimum distance H between the keys 43a, 44a and the substrate 41a in a vertical direction. As described in the BACKGROUND, there is a problem in the related art that a corner end of a key 44a with a large length is pressed and an input fails, which affects the input efficiency.

Figure 2:
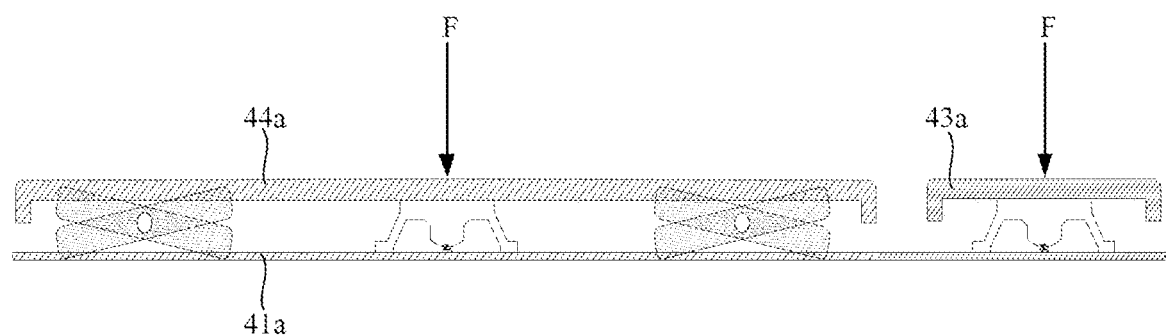
FIG. 2 is a schematic diagram of an application scenario of the keys shown in FIG. 1.

In view of the foregoing problems, research and development personnel of this application have found that the cause to the foregoing problems is as follows: when a corner end of a key 44a with a large length is pressed, the pressed end of the key 44a tends to move down before other parts of the key 44a, and as a result an input fails. For this, the research and development personnel have tried to perform mechanical analysis on a pressing process of the key 44a, and details are as follows:

FIG. 2 schematically shows a scenario in which a key 43a, 44a shown in FIG. 1 are pressed. Referring to FIG. 2, if a user applies a pressure to the middle of the key 43a, 44a, the key 43a, 44a moves downward under the pressure, and the elastic member is driven to retract downward. The retracting distance h of the key 43a, 44a is greater than or equal to a distance d between a first electrical contact 46a and a second electrical contact 47a, so that when a distance by which the key 43a, 44a moves downward reaches h, the first electrical contact 46a and the second electrical contact 47a are in contact, thereby implementing an input.

Figure 3A:
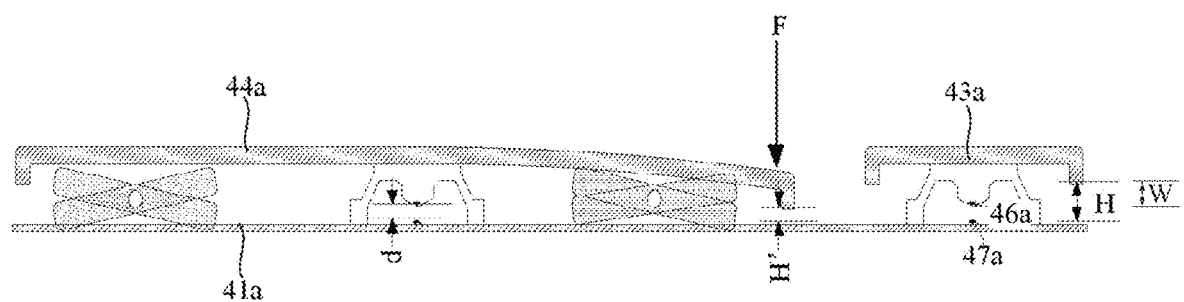
FIGS. 3(a) and 3(b) show a schematic diagram of another application scenario of the keys shown in FIG. 1.
Figure 3B:
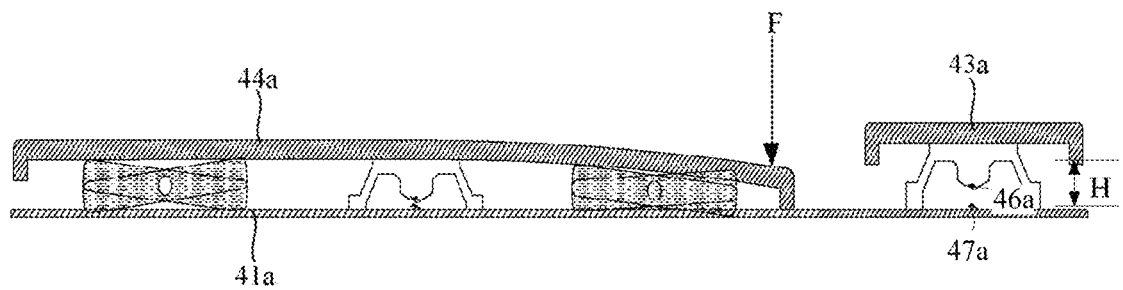

FIGS. 3(a) and 3(b) schematically show another scenario in which the keys shown in FIG. 1 are pressed. Referring to FIGS. 3(a) and 3(b), if a user applies a pressure to a corner end of the key 44a, in this case, the key 44a may be considered as a simply supported beam supported by the elastic member. FIG. 3(a) shows a scenario in which the key 44a is pressed, and FIG. 3(b) shows the key 44a being pressed further following the scenario in FIG. 3(a). According to a mechanical principle, the pressed corner end of the key 44a is bent and deformed to a certain extent. For a deformation degree of the corner end, reference may be made to the following formula: $W=FL^3/3EI$. W is a deformation deflection (unit: mm), I is a moment of inertia of section (unit: $mm^4$), E is an elastic modulus of the material of the key (unit: MPa), L is a distance between a position at which the key is pressed and the middle of the key in a length direction of the key (unit: mm), and F is the pressure applied to the key (unit: N). Because the keys 43a, 44a have substantially the same material, shape, and thickness, the keys 43a, 44a have an equal elastic modulus E and an equal moment I of inertia of section. On the premise that the same pressure is applied to the keys 43a, 44a, it may be understood that the deformation degrees of the keys 43a, 44a are only related to L. That is, the deformation degrees of the keys 43a, 44a are related to the lengths of the keys 43a, 44a.

In an example in the related art, the lengths of a spacebar key and a shift key are greater than the lengths of an alphabetical key and a numeric key. The length of the spacebar key is five times the length of the alphabetical key or the numeric key. Therefore, for an alphabetical key or a numeric key, even if a pressure is applied to a corner end of the key 43a, a distance L between a pressed position of the key 43a and the middle of the key 43a is small in a length direction of the key 43a, and a deformation deflection of the pressed corner end of the key 43a is small and negligible. Therefore, the key 43a is considered as being pressed synchronously.

For a key 44a with a large length, for example, the spacebar key and the shift key, when a pressure is applied to a corner end of the key 44a, in a length direction of the key 44a, a distance L between a position at which the key 44a is pressed and the middle of the key 44a is large, and a deformation deflection of the pressed corner end of the key 44a is large. As a result, a minimum distance between the key 44a and the substrate 41a is reduced from H to H', and H−H'=W. Next, the key 44a continues to move down under the action of the pressure. In a case that H' is less than the distance d between the first electrical contact 46a and the second electrical contact 47a, the pressed corner end of the key 44a is first in contact with the substrate 41a. In this case, the first electrical contact 46a and the second electrical contact 47a have not been in contact with each other, the key 44a has not been in conduction and cannot continue to move downward, and as a result an input fails.

Based on this, the research and development personnel of this application have eventually figured out that while keeping the distance d between the first electrical contact and the second electrical contact unchanged, a groove is provided in the substrate at a position corresponding to a key with a large length, so that a distance between the key with a large length and the substrate is increased, to ensure that when the corner end of the key is pressed and deformed, the minimum distance between the key and the substrate is not reduced from H to be less than the distance d between the first electrical contact and the second electrical contact. In this way, the first electrical contact can be in conduction with the second electrical contact before the key completely touches the substrate, thereby ensuring a valid input.

The embodiments of this application provide an electronic device. The electronic device may be a mobile terminal, a fixed terminal, or a foldable device such as a desktop computer, a laptop (laptop), a tablet computer (Table), an ultra-mobile personal computer (ultra-mobile personal computer, UMPC), a handheld computer, a walkie-talkie, a netbook, a POS machine, or a personal digital assistant (personal digital assistant, PDA).

Figure 4:
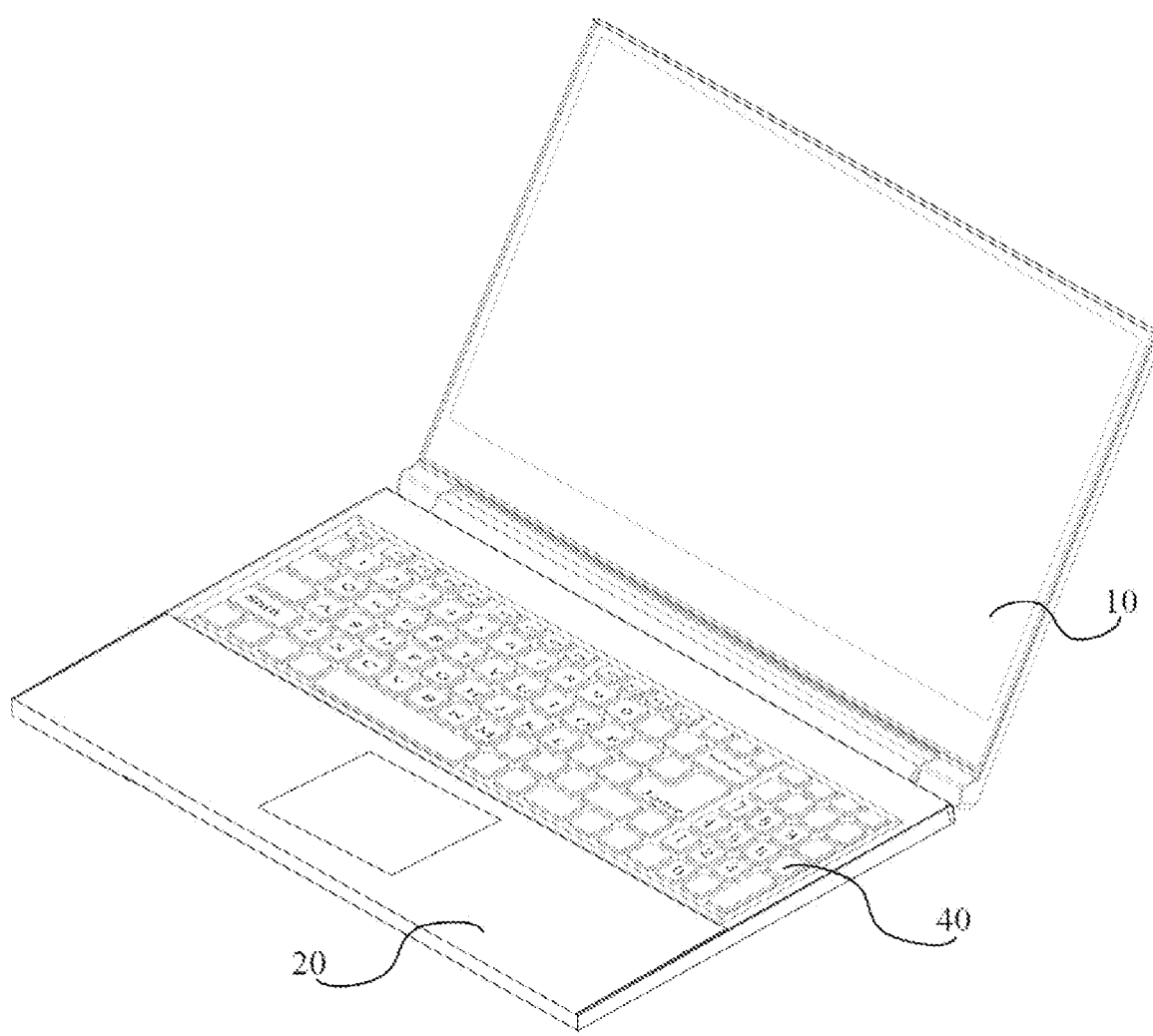
FIG. 4 is a schematic diagram of a scenario according to an embodiment of this application.

FIG. 4 schematically shows a three-dimensional structure of an electronic device 100 according to an embodiment. In the embodiment shown in FIG. 4, the electronic device 100 may be a laptop. Specifically, the laptop may include a display screen 10 and a main unit 20. The display screen 10 is rotatably connected to the main unit 20. For example, the display screen 10 may be connected to the main unit 20 by a rotary shaft. Alternatively, the display screen 10 may be rotatably connected to the main unit 20 by a hinge structure. Alternatively, in some examples, the display screen 10 and the main unit 20 may be devices independent of each other. For example, the display screen 10 and the main unit 20 are detachable. The display screen 10 is placed on the main unit 20 during use, and the display screen 10 and the main unit 20 may be separated from each other after use.

It needs to be noted that, to implement the display of the display screen 10, the display screen 10 is electrically connected to the main unit 20. For example, the display screen 10 may be electrically connected to the main unit 20 by a contact, or the display screen 10 may be electrically connected to the main unit 20 by a flexible substrate (Flexible Printed Circuit, FPC), or the display screen 10 may be electrically connected to the main unit 20 by a wire. In addition, the display screen 10 may be wirelessly connected to the main unit 20 by a wireless signal.

Figure 5:
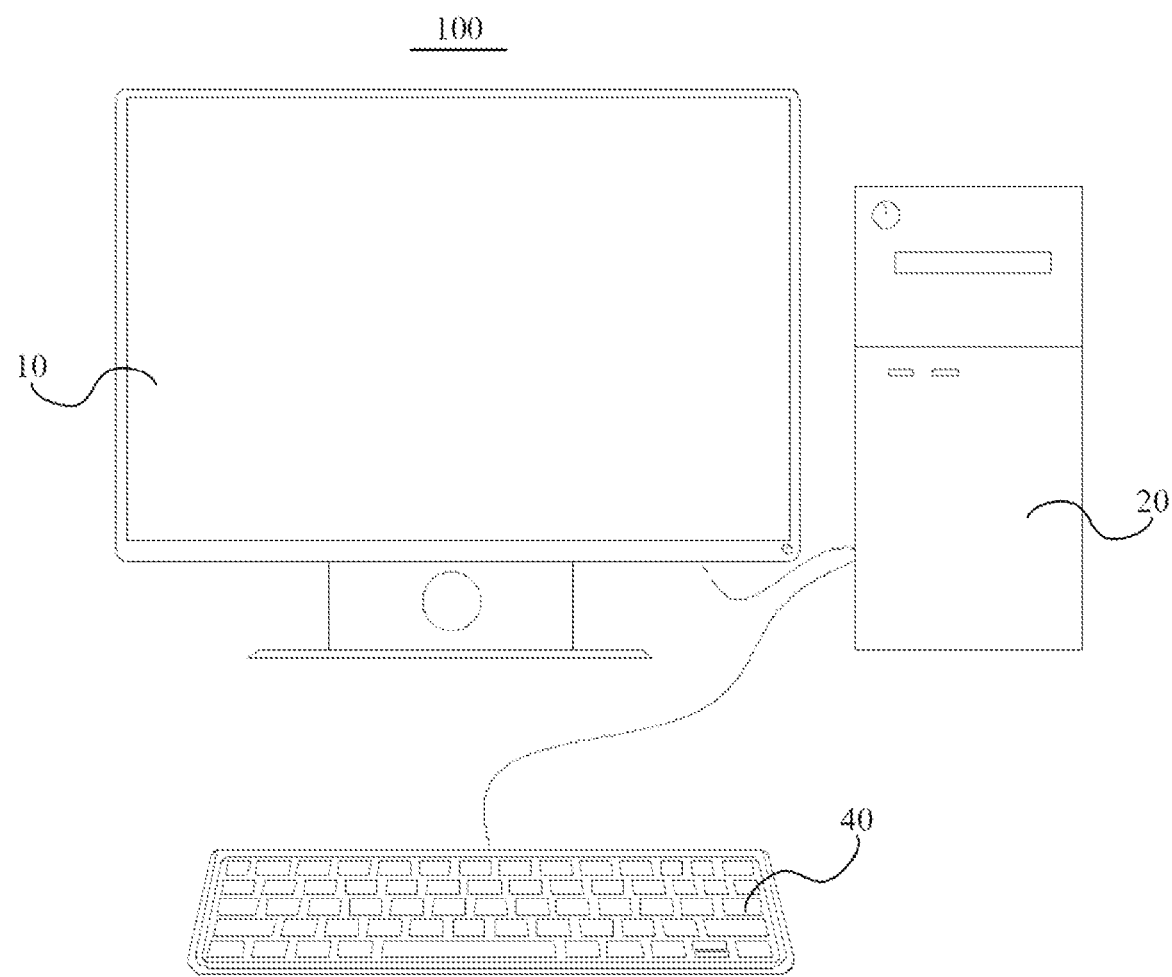
FIG. 5 is a schematic diagram of another scenario according to an embodiment of this application.

FIG. 5 schematically shows a three-dimensional structure of an electronic device 100 according to another embodiment. In the embodiment shown in FIG. 5, the electronic device 100 may be a desktop computer. Specifically, the desktop computer may include a display screen 10 and a main unit 20. The display screen 10 and the main unit 20 are arranged independently of each other. The display screen 10 is electrically connected to the main unit 20 by a data line, to implement the display of the display screen 10.

Figure 6:
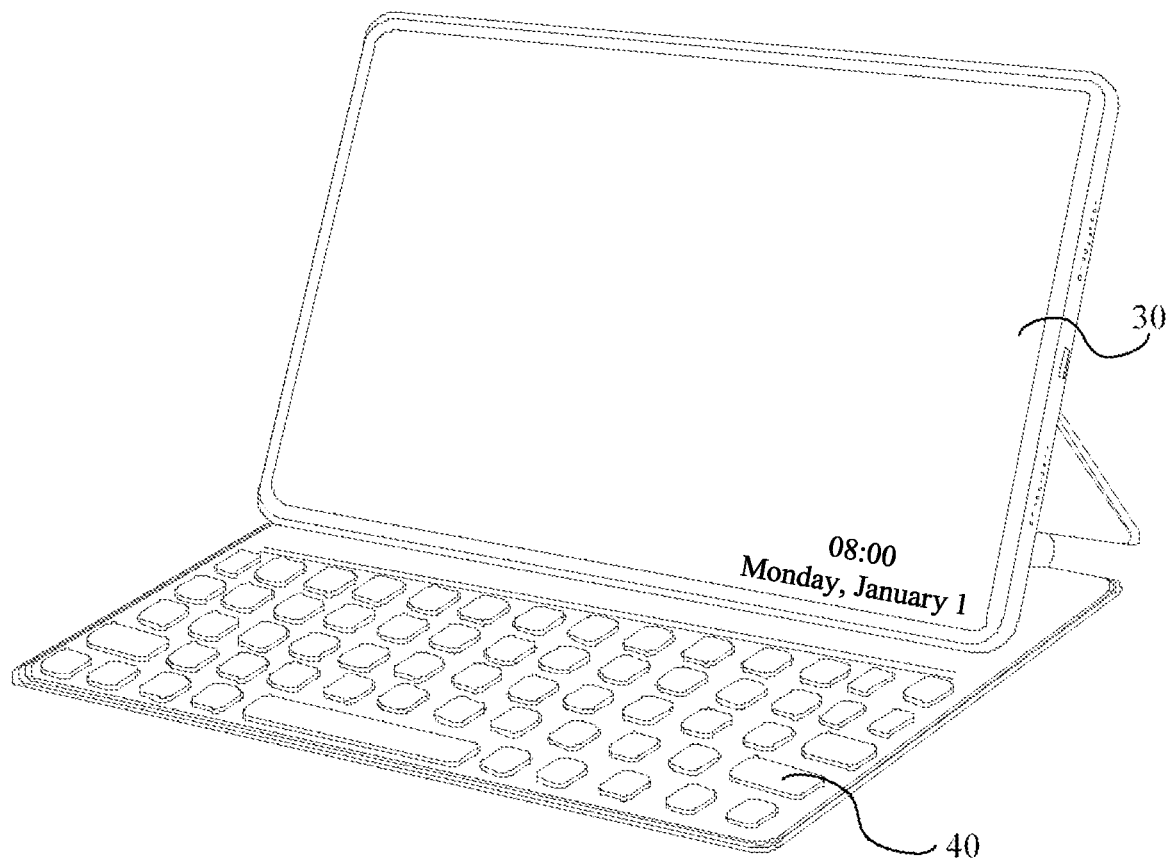
FIG. 6 is a schematic diagram of still another scenario according to an embodiment of this application.

FIG. 6 schematically shows a three-dimensional structure of an electronic device 100 according to still another embodiment. In the embodiment shown in FIG. 6, the electronic device 100 may be a tablet computer 30. Specifically, similar to the laptop and the desktop computer, the tablet computer 30 also includes a display screen 10 and a main unit 20. The display screen 10 and the main unit computer 20 are integrated rather than independent.

It can be seen from FIG. 5 and FIG. 6 that, regardless of whether the electronic device 100 is a laptop, a desktop computer, or a tablet computer 30, the electronic device 100 may include a keyboard 40. The keyboard 40 may provide an input to the electronic device 100, and the electronic device 100 performs an operation in response to the input based on the input of the keyboard 40.

When the electronic device 100 is a laptop, the keyboard 40 may be arranged on the main unit 20. The keyboard 40 is electrically connected to a control unit inside the main unit 20, and the keyboard 40 is used as an input device of the laptop. During use, the user may press a key on the keyboard 40 to input a character or an operation instruction.

When the electronic device 100 is a desktop computer, the keyboard 40 and the main unit 20 are arranged independently of each other. The keyboard 40 is electrically connected to the main unit 20 by a data line, and the keyboard 40 can be used as an input device of the desktop computer. In some other implementable embodiments, the keyboard 40 may be wirelessly connected to the main unit 20 by a wireless signal (for example, a Bluetooth signal).

When the electronic device 100 is a tablet computer 30, the tablet computer 30 and the keyboard 40 may be devices independent of each other. For example, the tablet computer 30 and the keyboard 40 may be detachable. The tablet computer 30 may be placed on the keyboard 40 during use, and the tablet computer 30 and the keyboard 40 may be separated from each other after use.

For example, the keyboard 40 may be electrically connected to the tablet computer 30 by a contact. Alternatively, the keyboard 40 is electrically connected to the tablet computer 30 by a wire. Alternatively, the keyboard 40 may be wirelessly connected to the tablet computer 30 by a wireless signal (for example, a Bluetooth signal). In the embodiments of this application, the keyboard 40 may be, for example, a wireless keyboard shown in FIG. 6.

Figure 7:
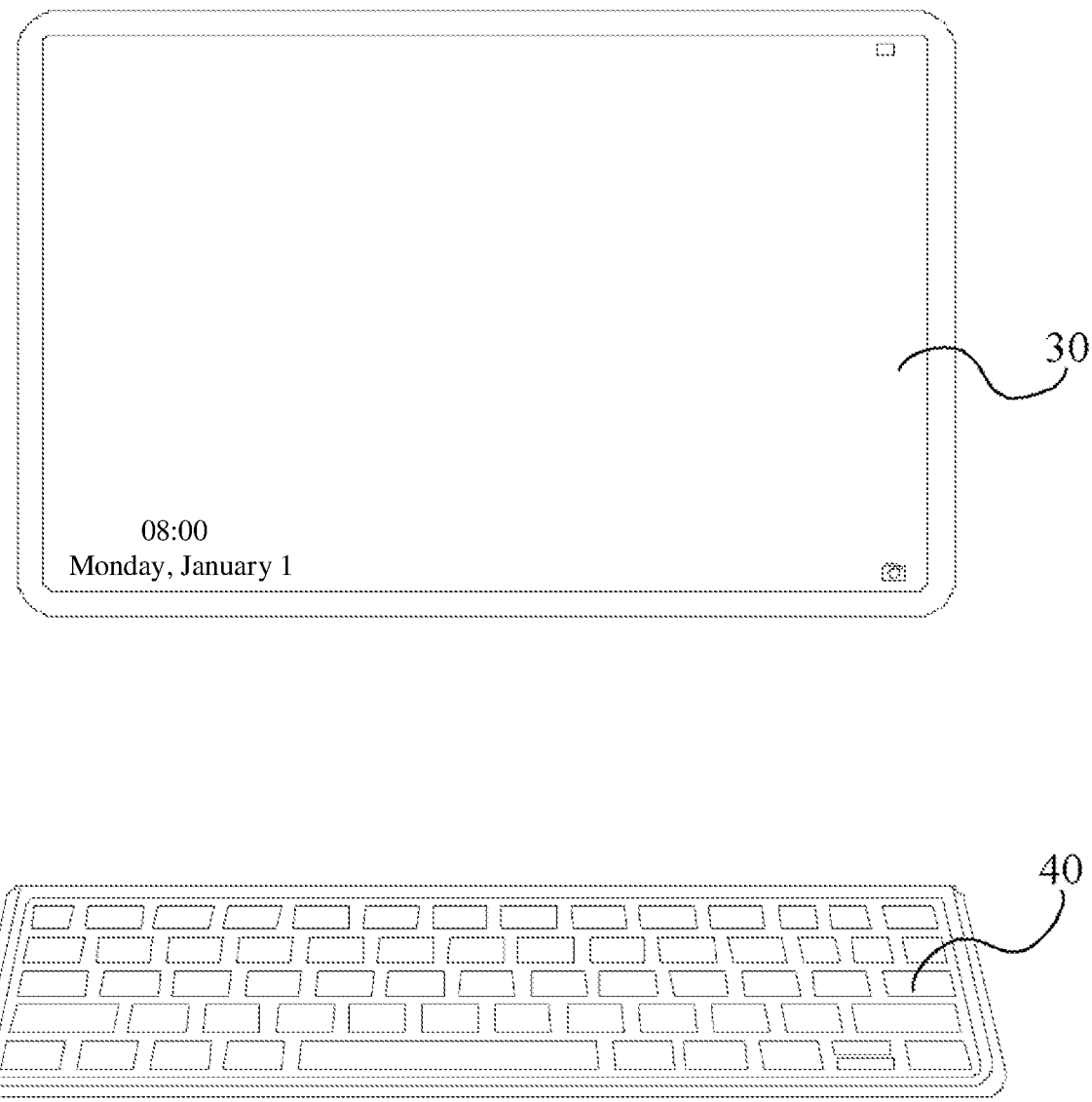
FIG. 7 is a schematic diagram of yet another scenario according to an embodiment of this application.

FIG. 7 schematically shows an application scenario of an electronic device 100 according to yet another embodiment. Referring to FIG. 7, both the tablet computer 30 and the keyboard 40 may be spaced apart at a predetermined distance for use, and the keyboard 40 may be wirelessly connected to the tablet computer 30 by a wireless signal (for example, a Bluetooth signal), so that a user can arbitrarily adjust a placement position of the keyboard 40 according to a personal use habit. In the embodiments of this application, the keyboard 40 may be, for example, a wireless keyboard shown in FIG. 6 or FIG. 7.

In an embodiment, the tablet computer 30 and the keyboard 40 may be interconnected by a communication network to implement the interaction of wireless signals. The communication network may be, but is not limited to, a short-range communication network such as a Wi-Fi hotspot network, a Wi-Fi peer-to-peer (peer-to-peer, P2P) network, a Bluetooth network, a Zigbee network, a near field communication (near field communication, NFC) network, or the like.

An implementation of the keyboard 40 provided in the embodiments of this application is described in detail below.

Figure 8:
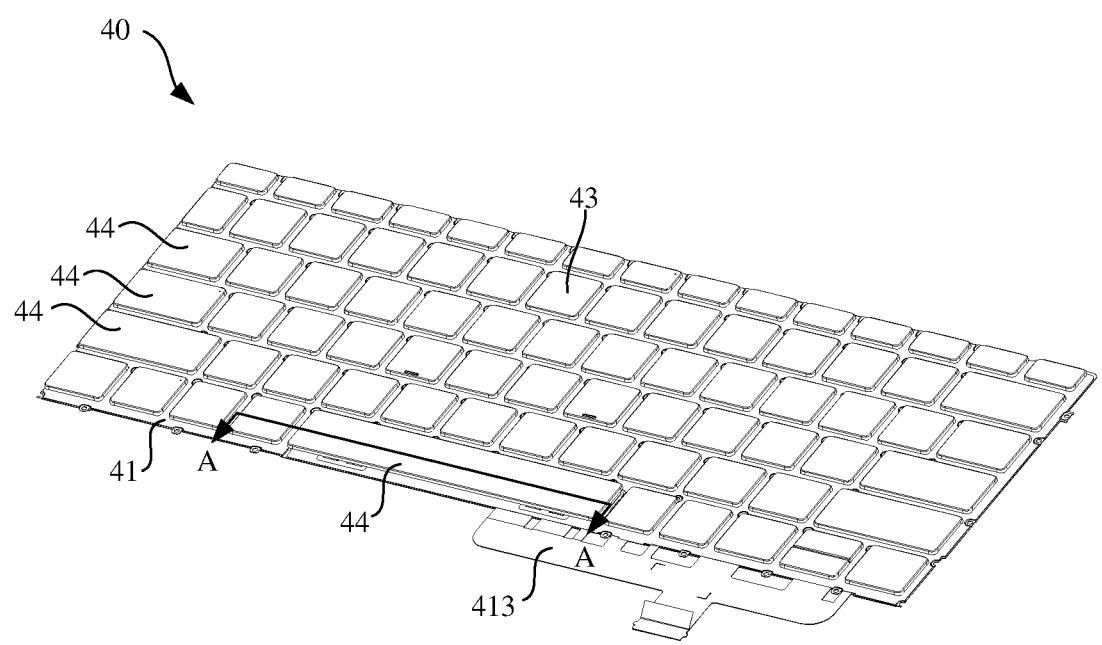
FIG. 8 is a schematic structural diagram of a keyboard according to an embodiment of this application.
Figure 9:
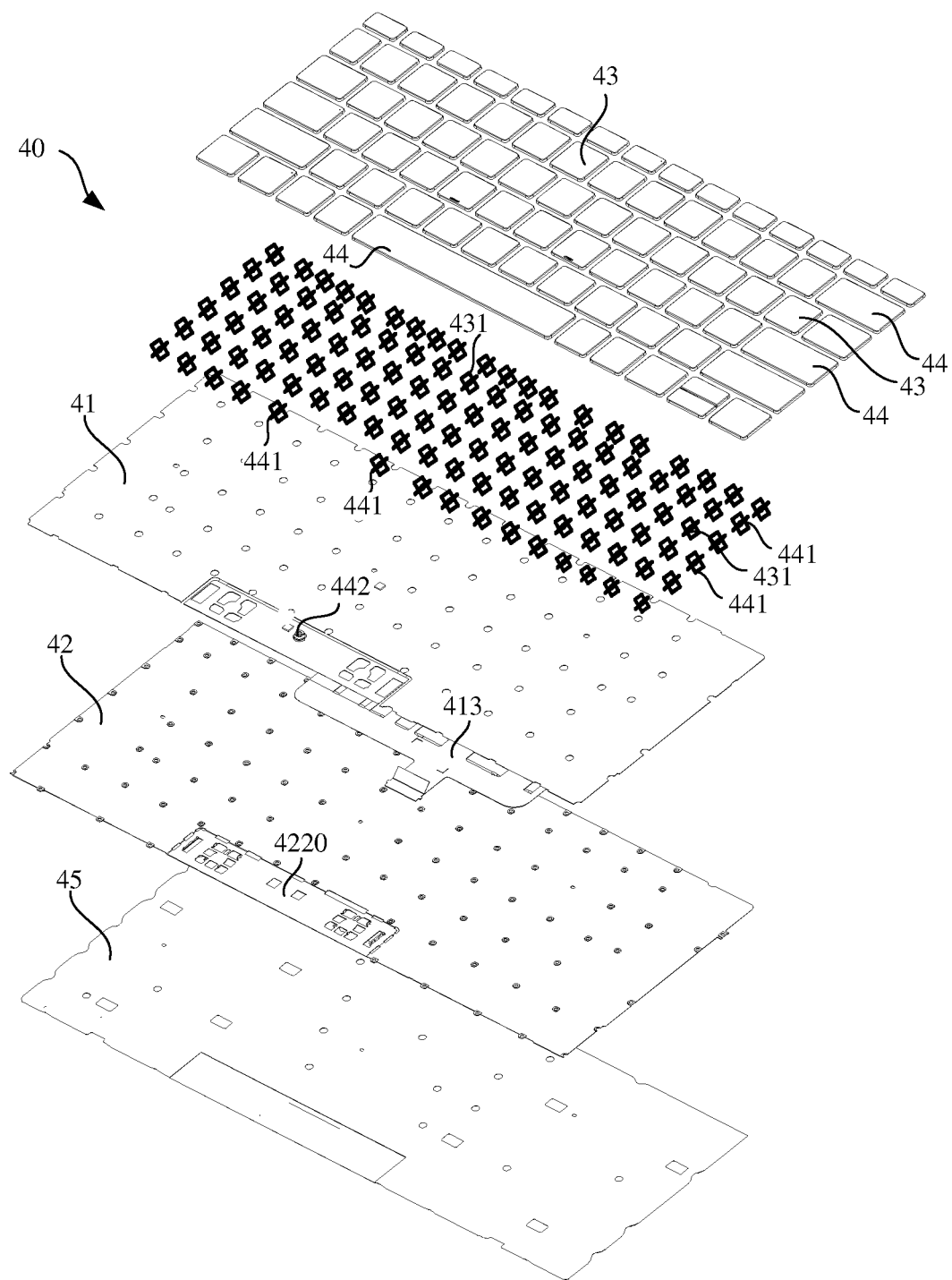
FIG. 9 is a schematic exploded view of a keyboard according to an embodiment of this application.

FIG. 8 schematically shows a three-dimensional structure of a keyboard 40. FIG. 9 schematically shows an exploded structure of a keyboard 40. Referring to FIG. 8 and FIG. 9, the keyboard 40 provided in the embodiments of this application includes a substrate 41, a first key 43, and a second key 44. Both the first key 43 and the second key 44 are retractably arranged on the substrate 41. The substrate 41 can provide support for the first key 43 and the second key 44.

The shape of the first key 43 is not limited. For example, the shape of the first key 43 may be square, or the shape of the first key 43 may be rectangular. A plurality of first keys 43 are provided. In terms of functions, the plurality of first keys 43 may be used for inputting letters. In this case, the first keys 43 are all alphabetical keys (for example, as shown in FIG. 4). Alternatively, the plurality of first keys 43 may all be used for inputting numbers. In this case, the first keys 43 are all numeric keys (for example, as shown in FIG. 4). Certainly, among the plurality of first keys 43, some first keys 43 may be arranged as alphabetical keys and some other are arranged as numeric keys.

The first keys 43 may have the same length. For example, all the first keys 43 have a length of 1.6 cm. Alternatively, at least two of the plurality of first keys 43 may have different lengths. For example, when some first keys 43 are used for inputting letters and some other first keys 43 are used for inputting numbers, the length of each first key 43 used for inputting a letter may be 1.6 cm, and the length of each first key 43 used for inputting a number may be 1.8 cm.

It may be understood that all the first keys 43 may be centrally arranged in a region of the substrate 41, and the plurality of first keys 43 may be spaced apart in a length direction of the substrate 41, so that the layout of the first keys 43 is orderly, making it convenient for a user to quickly locate a key to be operated.

The shape of the second key 44 may be rectangular. At least one second key 44 is provided. That is, one or more second keys 44 may be provided. In addition, the length of the second key 44 is greater than the length of the first key 43. That is, when a plurality of second keys 44 are provided, the lengths of all the second keys 44 can be greater than the length of the first key 43. In this way, because the second key 44 has a larger length, the user can easily distinguish the first key 43 from the second key 44, thereby easily locating the second key 44.

In some embodiments, the second key 44 may be used for inputting an execution instruction. In this case, the second key 44 is a function key, so that the user can easily distinguish the function key, thereby facilitating a quick operation. For example, the second key 44 may be used for inputting a space. In this case, the second key 44 is a spacebar key (Spacebar key). Alternatively, the second key 44 may be used for deletion. In this case, the second key 44 is a backspace key (Backspace). Alternatively, the second key 44 may be used for converting an input method. In this case, the second key 44 is a shift key (Shift key).

It should be further noted that, when a plurality of second keys 44 are provided, the second keys 44 may have the same length or different lengths. For example, when two second keys 44 are provided, one of the second keys 44 is a spacebar key, and another second key 44 is a shift key, the length of the spacebar key may be 10.2 cm, and the length of the shift key may be 4.5 cm.

A surface of the first key 43 facing away from the substrate 41 and a surface of the second key 44 facing away from the substrate 41 are coplanar, so that a top surface of the first key 43 and a top surface of the second key 44 are flush, and a surface of the keyboard 40 touched by the user is flat, to provide better user experience. The thickness of the first key 43 and the thickness of the second key 44 may be the same. Correspondingly, a surface of the first key 43 facing the substrate 41 and a surface of the second key 44 facing the substrate 41 are coplanar. Alternatively, the thickness of the first key 43 and the thickness of the second key 44 may be not the same. The surface of the first key 43 facing the substrate 41 and the surface of the second key 44 facing the substrate 41 are not flush.

The substrate 41 may be a flexible print circuit (Flexible Print Circuit; FPC) of a membrane keyboard 40, a printed circuit board made of a metal material such as aluminum or copper, or a metal plate on which a thin film circuit board is arranged.

Figure 10:
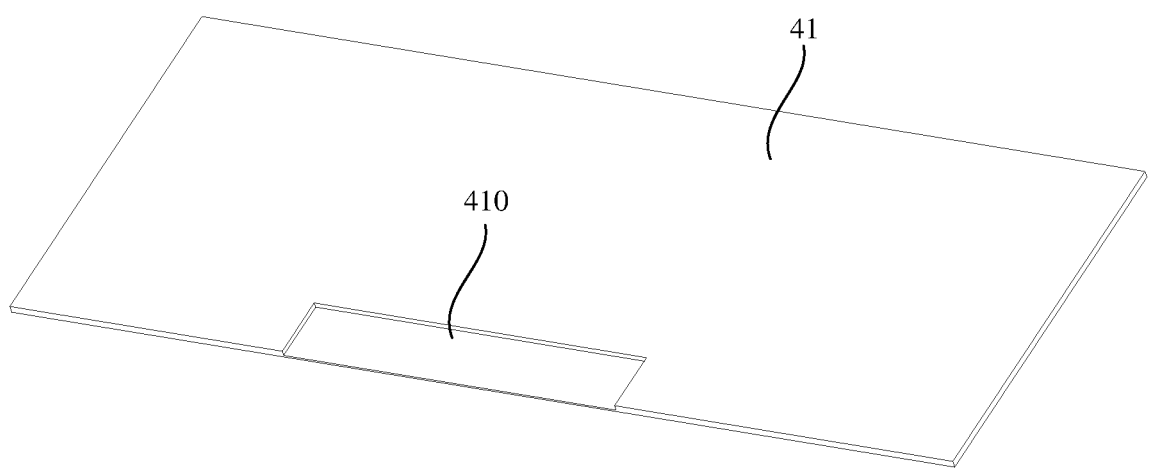
FIG. 10 is a schematic structural diagram of a substrate in a keyboard according to an embodiment of this application.

FIG. 10 is a schematic structural diagram of a substrate 41. At least one groove 410 is further formed in the substrate 41. The shape of the groove 410 is adapted to the shape of the second key 44. Each second key 44 is correspondingly arranged in one groove 410 and connected to a groove bottom of a groove 410 that is right opposite. In FIG. 10, for example, one second key 44 is provided, and one groove 410 is provided in the substrate 41. The second key 44 is further retractably arranged on the substrate 41, so that the second key 44 can move up and down relative to the substrate 41 to implement an input. In addition, when the second key 44 moves downward under a pressure, the second key 44 can extend into the groove 410. That is, a movement range of the second key 44 is between the second key 44 and the groove 410.

Figure 11:
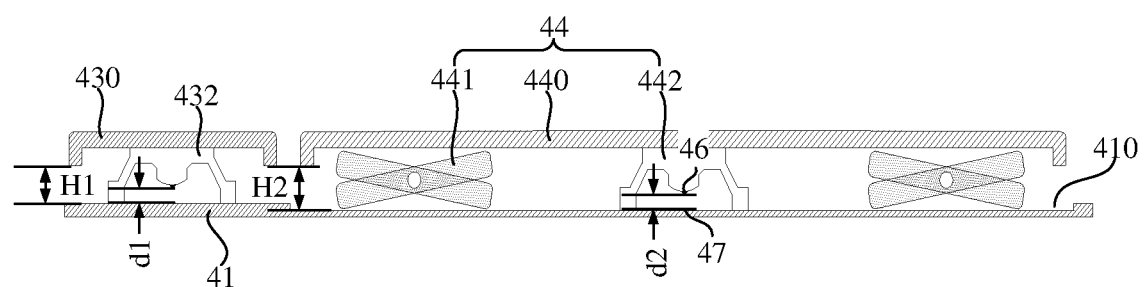
FIG. 11 is a cross-sectional view of another keyboard according to an embodiment of this application.

FIG. 11 schematically shows a cross-sectional structure of some keys in a keyboard 40. In the keyboard 40, FIG. 11 is obtained by cutting in an A-A direction shown in FIG. 8. It may be understood that the first key 43 is arranged in a region on the substrate 41 in which no groove 410 is provided. The second key 44 is arranged in the groove 410 in the substrate 41. In a vertical direction, a distance between the first key 43 and the substrate 41 is a first distance H1, and a distance between the second key 44 and a groove bottom of the groove 410 in the substrate 41 is a second distance H2. When a retracting distance of the first key 43 is set to h1 and a retracting distance of the second key 44 is set to h2, it can be learned with reference to the foregoing that h1<H1, h2<H2.

It may be understood that, to enable normal inputs of the first key 43 and the second key 44, the first key 43 and the second key 44 are in conduction with the substrate 41 when or before the first key 43 and the second key 44 are completely compressed. For example, the first key 43 and the substrate 41 are in conduction through an electrical contact. In this example, a first electrical contact 46 and a second electrical contact 47 right opposite the first electrical contact 46 are respectively arranged on the first key 43 and the substrate 41, a distance between the first electrical contact 46 of the first key 43 and the corresponding second electrical contact 47 is d1, and d1 is less than or equal to h1. Similarly, a first electrical contact 46 and a second electrical contact 47 right opposite the first electrical contact 46 are respectively arranged on the second key 44 and the groove bottom of the groove 410, a distance between the first electrical contact 46 of the second key 44 and the corresponding second electrical contact 47 is d2, and d2 is less than or equal to h2.

In summary, it can be seen that a relationship among the first distance H1, the retracting distance h1 of the first key 43, and the distance d1 between the first electrical contact 46 of the first key 43 and the corresponding second electrical contact 47 is as follows: $d1 \leq h1 < H1$. A relationship among the second distance H2, the retracting distance h2 of the second key 44, and the distance d2 between the first electrical contact 46 of the second key 44 and the corresponding second electrical contact 47 is as follows: $d2 \leq h2 < H2$. d1 may be equal to d2. That is, when the first key 43 and the first electrical contact 46 of the second key 44 move in a direction toward the substrate 41 by d1 or d2, the first key 43 and the second key 44 may be in conduction.

In addition, the second distance H2 is greater than the first distance H1. In some cases, for example, as shown in FIG. 11, when the thickness of the first key 43 is greater than or equal to the thickness of the second key 44, based on that the first key 43 and the second key 44 are not pressed and the first key 43 and the second key 44 are in an initial state, because the groove 410 is provided in the substrate 41 at a position right opposite the second key 44, the second distance H2 is greater than the first distance H1. A difference between the second distance H2 and the first distance H1 is the depth D of the groove 410, that is, H2−H1=D. Alternatively, in some cases, the thickness of the second key 44 is greater than the thickness of the first key 43, and a difference T between the thickness of the second key 44 and the thickness of the first key 43 is less than the depth D of the groove 410, so that the second distance H2 is greater than the first distance H1. For example, the second distance H2 may be 1.75 mm and the first distance H1 may be 1.6 mm.

Figure 12A:
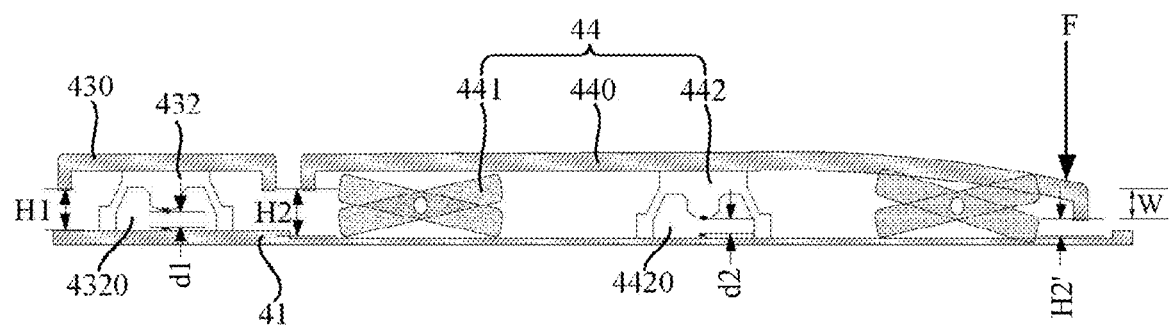
FIGS. 12(a) and 12(b) show a diagram of an application scenario of the keyboard shown in FIG. 11.
Figure 12B:
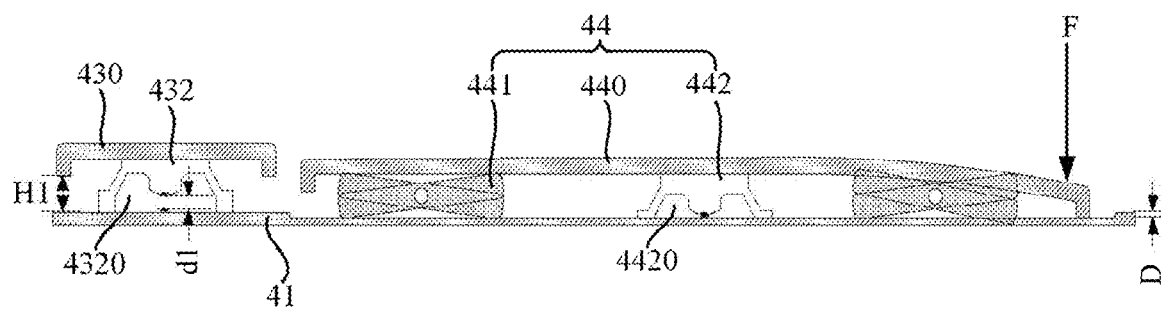

FIGS. 12(a) and 12(b) schematically show a scenario in which the keys shown in FIG. 11 are pressed. Referring to FIGS. 12(a) and 12(b), when a user applies a pressure to a corner end of the second key 44, the corner end of the second key 44 is bent and deformed downward to a degree of W.

FIG. 12(a) shows a scenario in which the key 44 is pressed, and FIG. 12(b) shows the key 44 being pressed further following the scenario in FIG. 12(a). In this case, the distance between the second key 44 and the groove bottom of the groove 410 is reduced by W from H2. For example, if the second distance H2 is 1.75 mm and in a case a deformation deflection of the corner end of the second key 44 can reach 0.25 mm under the applied pressure, the distance between the second key 44 and the groove bottom of the groove 410 becomes 1.5 mm under the pressure.

The deformation deflection $W=FL3/3EI$. It can be learned that when the pressure applied to the corner end of the second key 44 is larger, the deformation deflection W of the second key 44 is larger, so that the distance between the second key 44 and the groove bottom of the groove 410 is smaller. However, it may be understood that the deformation deflection W does not increase indefinitely along with the magnitude of the pressure. When the applied pressure reaches a critical pressure value, the corner end of the second key 44 bends downward and reaches a maximum deformation deflection Wmax. For example, when the length of the second key 44 is 10.2 cm, the maximum deformation deflection Wmax of the corner end of the second key 44 is 0.255 mm.

It needs to be noted that, as shown in FIGS. 12(a) and 12(b), when the thickness of the first key 43 is greater than or equal to the thickness of the second key 44, the depth D of the groove 410 is greater than or equal to the maximum deformation deflection Wmax of the second key 44. With such an arrangement, when the corner end of the second key 44 is bent and deformed under pressure, the distance between the second key 44 and the groove bottom of the groove 410 may be reduced at least from H2 to H2', and H2−Wmax=H2'. Because the maximum deformation deflection Wmax of the second key 44 is less than or equal to the depth D of the groove 410 and H2−H1=D, H2' is greater than or equal to H1. With reference to d1=d2<H1, it can be inferred that d1=d2<H1<H2'. That is, even if the corner end of the second key 44 is bent to a maximum extent under the pressure, the distance d2 between the first electrical contact 46 and the second electrical contact 47 of the second key 44 can still remain less than a minimum distance H2' between the second key 44 and the substrate 41, so that the second key 44 continues to move downward under the pressure until the first electrical contact 46 has been in contact with the second electrical contact 47 before the second key 44 is in contact with the groove bottom of the groove 410, the second key 44 is in conduction, and an input succeeds.

Similarly, when the thickness of the second key 44 is greater than the thickness of the first key 43, and a difference T between the thickness of the second key 44 and the thickness of the first key 43 is less than the depth D of the groove 410, a difference between T and the depth D of the groove 410 is greater than or equal to the maximum deformation deflection Wmax of the second key 44.

In general, the depth D of the groove 410 is set to be greater than or equal to the maximum deformation deflection Wmax of the second key 44, so that a minimum distance H2' between the second key 44 and the substrate 41 after the corner end of the second key 44 is pressed is greater than the distance d2 between the first electrical contact 46 and the second electrical contact 47, to allow the first electrical contact 46 and the second electrical contact 47 to be in conduction after the second key 44 is fully pressed.

In summary, for the keyboard 40 provided in the embodiments of this application, a groove 410 for mounting a second key 44 is provided in a substrate 41, a distance between the second key 44 and the substrate 41 is increased. In addition, in a case that a distance d2 between a first electrical contact 46 of the second key 44 and a corresponding second electrical contact 47 is consistent with a distance d1 between a first electrical contact 46 of the first key 43 and a corresponding second electrical contact 47, a depth D of the groove 410 is designed to be greater than a maximum deformation deflection Wmax of the second key 44, so that even if a corner end of the second key 44 is bent and deformed under a pressure, a minimum distance H2' between the second key 44 and the substrate 41 can still be greater than the distance d2 between the first electrical contact 46 of the second key 44 and the corresponding second electrical contact 47. Before the second key 44 continues to be pressed to touch the groove bottom of the groove 410, the contacts are in contact to enable the second key 44 to implement an input successfully, thereby reducing the impact of an invalid input on input efficiency.

The length of the second key 44 may be not greater than 10.2 cm, and the depth D of the groove 410 may be greater than or equal to 0.15 mm and less than or equal to 0.255 mm. For example, if the length of the second key 44 is equal to 10.2 cm, and the maximum deformation deflection Wmax of the corner end of the second key 44 is 0.255 mm, the value of D may be 0.255 mm. In this case, the depth D of the groove 410 is equal to the maximum deformation deflection Wmax of the corner end of the second key 44, and this embodiment is applicable to a case that the thickness of the first key 43 is the same as the thickness of the second key 44. Therefore, when the corner end of the second key 44 is pressed and deformed, the distance between the second key 44 and the groove bottom of the groove 410 is H2'=H2−Wmax=H2−D=H1, so that the distance between the second key 44 and the groove bottom of the groove 410 is greater than d1 and d2, and the second key 44 is in conduction when the corner end of the second key 44 is in contact with the substrate 41.

When a plurality of second keys 44 are provided and the plurality of second keys 44 have different lengths, correspondingly, a plurality of grooves 410 are provided in the substrate 41, and the plurality of grooves 410 may have the same depth D or different depths D.

In this example, among the plurality of second keys 44, for example, only one second key 44 has a length equal to 10.2 cm, and the deformation deflection W of the corner end of the second key 44 is 0.255 mm. The lengths of the remaining second keys 44 are all less than 10.2 cm, and the deformation deflections W of the corner ends of these second keys 44 are less than 0.255 mm. It can be seen that a maximum deformation deflection in all the second keys 44 is 0.255 mm. In this case, the depths D of all the grooves 410 may be set to 0.255 mm, and the depth D of the groove 410 is equal to the maximum deformation deflection Wmax. For a second key 44 of a length equal to 10.2 cm, the deformation deflection W of the second key is equal to the depth D of a corresponding groove 410. For a second key 44 of a length less than 10.2 cm, the deformation deflection W of the second key is less than the depth D of a corresponding groove 410.

In the foregoing embodiments, referring to FIG. 9 and FIG. 11, each first key 43 may include a first key cap 430. The first key cap 430 is opposite to a region of the substrate 41 in which no groove 410 is provided and can move up and down relative to the substrate 41. Each second key 44 may include a second key cap 440. The second key cap 440 is opposite to the groove 410 in the substrate 41 and can move up and down relative to the substrate 41.

It can be learned according to the content described above that the length of the first key cap 430 is less than the length of the second key cap 440, so that the length of the first key 43 is less than the length of the second key 44. In addition, an orthographic projection area of the second key cap 440 toward a corresponding groove 410 is smaller than a notch area of the groove 410, to allow the second key cap 440 to move into or out of the groove 410 to ensure that the second key 44 can extend into the groove 410 when being pressed.

Referring to FIG. 9 and FIG. 11, the keyboard 40 further includes a first elastic member 432. One end of the first elastic member 432 is connected to the middle of the first key cap 430, and the other end of the first elastic member 432 is connected to the substrate 41. The first elastic member 432 is used for providing a resilient force for the first key cap 430, so that the first key cap 430 is retractably arranged on the substrate 41. In addition, the keyboard 40 further includes a second elastic member 442. One end of the second elastic member 442 is connected to the middle of the second key cap 440, and the other end of the second elastic member 442 is connected to the groove bottom of the groove 410. The second elastic member 442 is used for providing a resilient force for the second key cap 440, to allow the second key cap 440 to be retractably arranged on the substrate 41.

It should be noted that, because a vertical distance H1 between the first key cap 430 and the substrate 41 is less than a vertical distance H2 between the second key cap 440 and the groove bottom of the groove 410, a vertical height of the first elastic member 432 between the first key cap 430 and the substrate 41 is also less than a vertical height of the second elastic member 442 between the second key cap 440 and the substrate 41.

A retracting distance h1 of the first key 43 is consistent with a maximum deformation of the first elastic member 432, and a retracting distance h2 of the second key 44 is consistent with a maximum deformation of the second elastic member 442. Because the vertical height of the first elastic member 432 is less than the vertical height of the second elastic member 442, in some embodiments, the maximum deformation of the first elastic member 432 may be less than the maximum deformation of the second elastic member 442. That is, the retracting distance h1 of the first key 43 is less than the retracting distance h2 of the second key 44.

A first mounting groove 4320 may be provided in a surface of the first elastic member 432 facing the substrate 41, and the first electrical contact 46 of the first key 43 is arranged on a groove wall of the first mounting groove 4320. Similarly, a second mounting groove 4420 may be provided in a surface of the second elastic member 442 facing the groove 410, and the first electrical contact 46 of the second key 44 is arranged on the groove wall of the second mounting groove 4420.

In the foregoing embodiment, the groove 410 is provided in the substrate 41 at a position right opposite the second key 44, which may be implemented through the following possible implementations:

In an embodiment, as shown in FIG. 10, the substrate 41 includes a first surface and a second surface opposite to the first surface. The second surface of the substrate 41 is planar. A groove 410 is provided in the first surface. A distance between the groove bottom of the groove 410 and the second surface is less than a distance between the first surface and the second surface. That is, in this embodiment, the first surface of the substrate 41 is recessed downward to form the groove 410. The thickness of a position at which the groove 410 is formed in the substrate 41 is less than the thickness of a position at which no groove 410 is formed in the substrate 41. In this embodiment, the groove 410 can be machined in the substrate 41 through a process such as machining, and the second surface of the substrate 41 does not protrude, so that there is no need to improve a bottom plate 42 (see below) to which the substrate 41 is connected.

Figure 13:
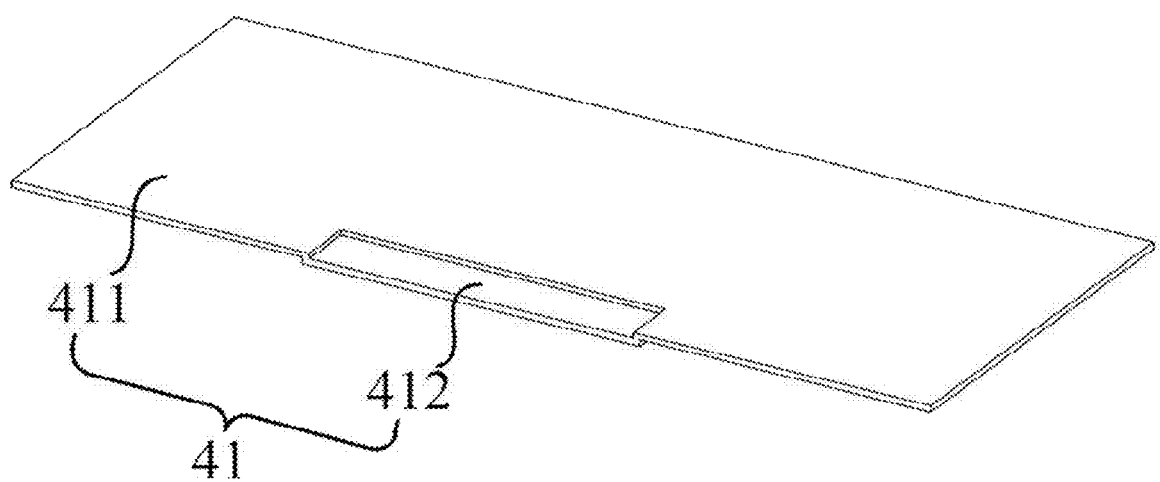
FIG. 13 is a schematic structural diagram of another substrate in a keyboard according to an embodiment of this application.

FIG. 13 is a schematic structural diagram of another substrate 41. In another embodiment, as shown in FIG. 13, the substrate 41 includes a body portion 411 and a recess portion 412 connected to the body portion 411 and protruding toward a side facing away from a second key cap 440. An inner wall of the recess portion 412 defines the groove 410. That is, in this embodiment, a local position of the substrate 41 protrudes downward to form the groove 410 in the first surface of the substrate 41. With such an arrangement, compared with the previous embodiment, the thickness of the recess portion 412 in this embodiment may be constructed to be not less than the thickness of the body portion 411, so that the substrate 41 can maintain a high structural strength while the groove 410 is formed.

For example, the body portion 411 and the recess portion 412 may be separately machined and then connected by welding, clamping, or the like. In this case, the thickness of the recess portion 412 may be greater than or equal to the thickness of the body portion 411 to enhance the strength of the substrate 41. Certainly, in another embodiment of this application, the groove 410 may be machined in the substrate 41 through a stamping process, so that the thickness of the recess portion 412 is equal to the thickness of the body portion 411, that is, the entire substrate 41 may have the same thickness. In addition, the body portion 411 and the recess portion 412 are formed as an integral piece through the stamping process. For the substrate 41, a process of mounting the recess portion 412 is omitted, so that the production efficiency is high and the strength of the substrate 41 can be improved without increasing costs.

Figure 14:
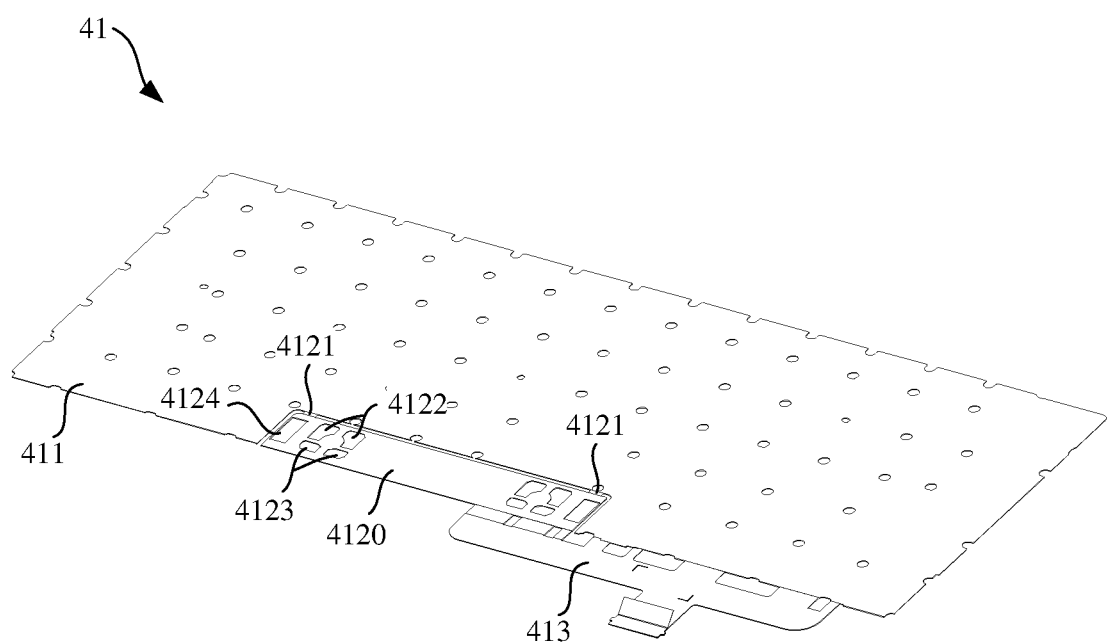
FIG. 14 is a schematic structural diagram of still another substrate in a keyboard according to an embodiment of this application.

FIG. 14 is a schematic structural diagram of still another substrate 41. As shown in FIG. 13 and FIG. 14, an opening (not shown) is provided at a position of a body portion 411 corresponding to a second key 44. A recess portion 412 may specifically include a first bearing plate 4120 and a connecting plate 4121. The connecting plate 4121 is arranged at a circumferential edge of the first bearing plate 4120 and extends toward the body portion 411. An end of the connecting plate 4121 away from the first bearing plate 4120 is connected to an inner wall of the opening, to connect the recess portion 412 and the body portion 411.

Specifically, as shown in FIG. 13, the shape and size of the first bearing plate 4120 may be respectively the same as the shape and size of the opening, so that a vertical projection of a groove 410 on a side of the substrate 41 facing a first key 43 coincides with the opening, and a groove bottom area of the groove 410, the notch area of the groove 410, and an opening area of the opening are all equal. In this case, the connecting plate 4121 may extend in a vertical direction.

In an example shown in FIG. 14, the size of the first bearing plate 4120 may be smaller than the size of the opening. That is, if the vertical projection of the first bearing plate 4120 on the side of the substrate 41 facing the first key 43 is located in the opening, the groove bottom area of the groove 410 is smaller than the notch area of the groove 410, and the notch area of the groove 410 is equal to the opening area of the opening. In this case, the connecting plate 4121 may extend obliquely and gradually extends from one end connected to the inner wall of the opening to the other end in a direction toward a center line of the opening. Compared with the connecting plate 4121 extending in the vertical direction in FIG. 13, in this case, angles between two ends of the connecting plate 4121 and the body portion 411 and the first bearing plate 4120 are not right angles, thereby avoiding stress concentration at connecting positions of the connecting plate 4121 to the body portion 411 and the first bearing plate 4120.

In a feasible manner, as shown in FIG. 14, a plurality of connecting plates 4121 may be provided, and the plurality of connecting plates 4121 are spaced apart around an edge of the first bearing plate 4120. A gap is formed between two adjacent connecting plates 4121. In this embodiment, if the size of the first bearing plate 4120 is smaller than the size of the opening, a certain distance exists between the first bearing plate 4120 and the body portion 411, and a gap is also formed between the first bearing plate 4120 and the body portion 411.

The opening may be provided at an edge of the body portion 411, the groove 410 is correspondingly arranged at an edge position of the substrate 41, and the second key 44 is retractably arranged at an edge of the substrate 41. In this embodiment, a flexible circuit board 413 may further be arranged at the keyboard 40, the flexible circuit board 413 is connected to an edge of a side of the body portion 411 in which an opening is provided, and the first bearing plate 4120 is connected to the body portion 411 by the flexible circuit board 413, so that the second key 44 arranged in the groove 410 can be electrically connected.

Figure 15:
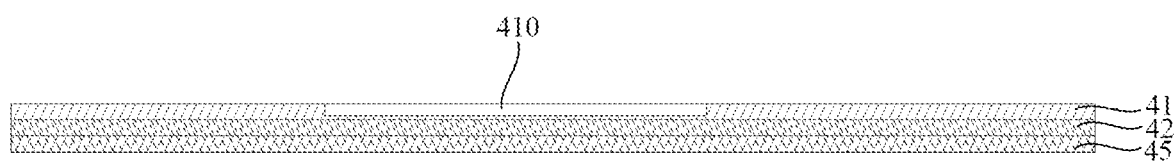
FIG. 15 is a schematic diagram of the substrate shown in FIG. 10 fitting a bottom plate and a protective film.
Figure 16:
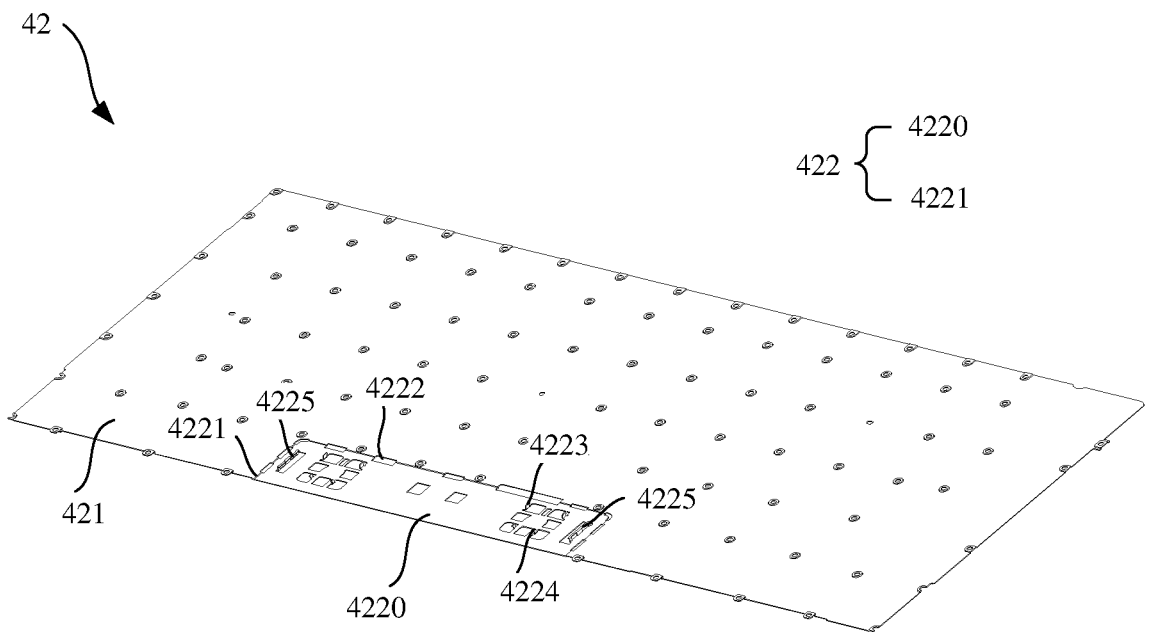
FIG. 16 is a schematic structural diagram of another bottom plate in a keyboard according to an embodiment of this application.
Figure 17:
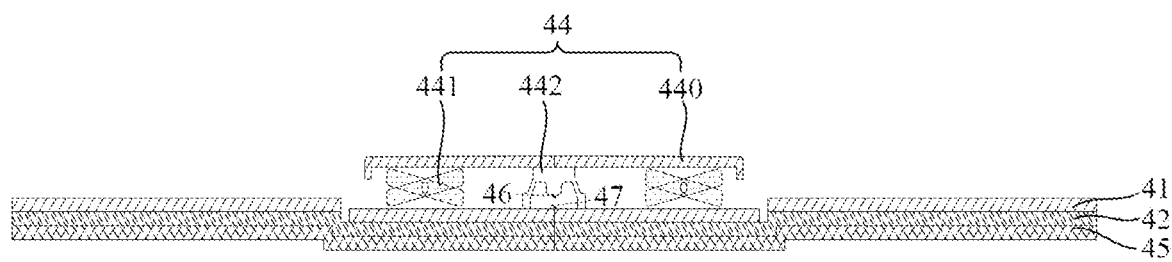
FIG. 17 is a schematic diagram of the still another substrate shown in FIG. 14 fitting another bottom plate.

FIG. 15 is a schematic diagram of the substrate shown in FIG. 10 fitting a bottom plate. FIG. 16 schematically shows the structure of another bottom plate. FIG. 17 shows a cross-sectional structure of the substrate shown in FIG. 14 fitting the bottom plate shown in FIG. 16. Still referring to FIG. 15 to FIG. 17, the keyboard 40 may further include a bottom plate 42. The bottom plate 42 is arranged on a side of the substrate 41 facing away from the first key 43 and the second key 44, and is connected to the substrate 41 to support the substrate 41. The bottom plate 42 may be a metal bottom plate 42 made of a metal material such as copper or an alloy, and has a high structural strength, so that the bottom plate 42 can stably support the substrate 41. It may be learned from the foregoing that in FIG. 10 and FIG. 15 the first surface of the substrate 41 may be recessed to form the groove 410. Correspondingly, the bottom plate 42 may be a flat plate, and the flat plate-shaped bottom plate 42 can be completely joined to the second surface of the substrate 41 to implement support.

Alternatively, in another alternative embodiment, as shown in FIG. 14, FIG. 16, and FIG. 17, a local position of the substrate 41 may protrude toward a side facing away from the second key cap 440 to form a recess portion 412, so that a groove 410 is formed in the substrate 41. Correspondingly, an accommodating groove 420 is formed in the bottom plate 42 (see FIG. 18 below). The recess portion 412 can be accommodated in the accommodating groove 420, to avoid a case that the bottom plate 42 and the substrate 41 cannot be joined to each other due to interference between the recess portion 412 and the bottom plate 42, so that the bottom plate 42 can implement support.

Figure 18:
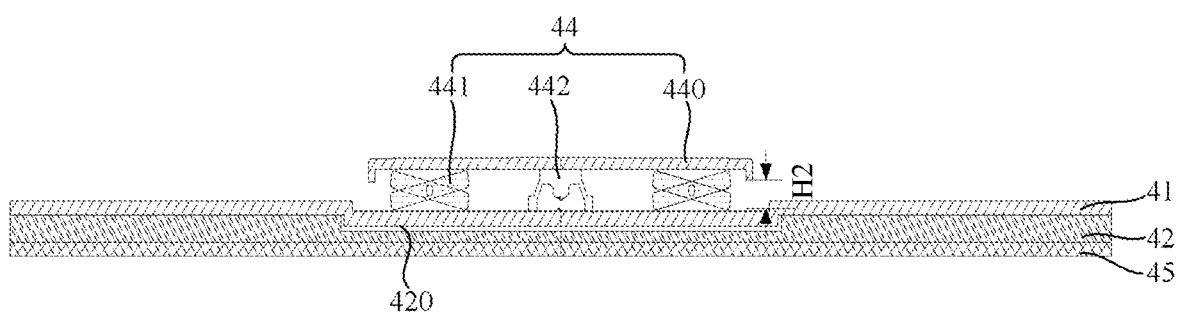
FIG. 18 is a schematic diagram of the another substrate shown in FIG. 13 fitting still another bottom plate.

It may be understood that implementations of forming the accommodating groove 420 in the bottom plate 42 include, but not limited to, the following possible implementation:

FIG. 18 is a schematic diagram of the substrate 41 shown in FIG. 13 fitting still another bottom plate 42. For example, in a first implementation, as shown in FIG. 18, the bottom plate 42 includes a third face facing the substrate 41 and a fourth face facing away from the substrate 41. The fourth face of the bottom plate 42 is planar, the accommodating groove 420 is provided in the third face, and a distance between a groove bottom of the accommodating groove 420 and the fourth face is less than a distance between the third face and the fourth face. In other words, the third face of the bottom plate 42 is recessed downward to form the accommodating groove 420, and the thickness of the bottom plate 42 at a position of the accommodating groove 420 is less than the thickness of the bottom plate 42 at a position corresponding to the body portion 411.

In another example, in a second implementation, as shown in FIG. 14, FIG. 16, and FIG. 17, the bottom plate 42 includes a flat plate portion 421 and a protruding portion 422. The protruding portion 422 is connected to the flat plate portion 421. The protruding portion 422 protrudes in a direction away from the substrate 41. An inner wall of the protruding portion 422 defines the accommodating groove 420. In other words, in this embodiment, a local position of the bottom plate 42 protrudes downward to form a groove 410 in the bottom plate 42. With such an arrangement, compared with the first implementation, a thickness of the protruding portion 422 in this embodiment can be constructed to be not less than the thickness of the flat plate portion 421, so that the structural strength of the bottom plate 42 can be enhanced while the accommodating groove 420 is formed in the bottom plate 42.

In this example, the flat plate portion 421 and the protruding portion 422 may be separately machined and then connected by welding, clamping, or the like. In this case, the thickness of the protruding portion 422 may be greater than or equal to the thickness of the flat plate portion 421 to enhance the strength of the bottom plate 42. Certainly, in another embodiment of this application, the accommodating groove 420 may be machined in the bottom plate 42 through a stamping process, so that the thickness of the protruding portion 422 is equal to the thickness of the flat plate portion 421. That is, the entire bottom plate 42 may have the same thickness. In addition, the flat plate portion 421 and the protruding portion 422 are formed as an integral piece through the stamping process. For the bottom plate 42, a process of mounting the protruding portion 422 is omitted, so that production efficiency is high and the strength of the bottom plate 42 can be improved without increasing costs.

For example, as shown in FIG. 16, the structure of the protruding portion 422 may specifically include a second bearing plate 4220 and a connecting rib 4221. The connecting rib 4221 is arranged at a circumferential edge of the second bearing plate 4220 and extends toward the flat plate portion 421, and an end of the connecting rib 4221 away from the second bearing plate 4220 is connected to the flat plate portion 421, to connect the flat plate portion 421 and the protruding portion 422.

In some examples, as shown in FIG. 18, a groove bottom area of the accommodating groove 420 may be equal to a notch area of the accommodating groove 420. Correspondingly, the connecting rib 4221 may be configured to extend in a vertical direction.

Alternatively, as shown in FIG. 16 and FIG. 17, the groove bottom area of the accommodating groove 420 may be smaller than the notch area of the accommodating groove 420. Correspondingly, the connecting rib 4221 may extend obliquely and extend from one end connected to the flat plate portion 421 to the other end in a direction toward a center line of the opening. Comparing with the connecting rib 4221 extending in the vertical direction, in this way, angles between two ends of the connecting rib 4221 and the flat plate portion 421 and the second bearing plate 4220 are not right angles, thereby avoiding stress concentration at connecting positions of the connecting rib 4221 with the flat plate portion 421 and the second bearing plate 4220.

A plurality of connecting ribs 4221 may be provided, and the plurality of connecting ribs 4221 are spaced apart around an edge of the second bearing plate 4220. The quantity of the connecting ribs 4221 is increased, which helps to improve the reliability of a connection between the second bearing plate 4220 and the flat plate portion 421. A gap 4222 is formed between two adjacent connecting ribs 4221 in the bottom plate 42 in this embodiment. Through such a design, compared with a case that the connecting rib 4221 connects an entire inner wall of the second bearing plate 4220, the gap 4222 is formed between two connecting ribs 4221, which further helps to avoid the stress concentration at connecting positions of the connecting rib 4221 with the flat plate portion 421 and the second bearing plate 4220.

Figure 19:
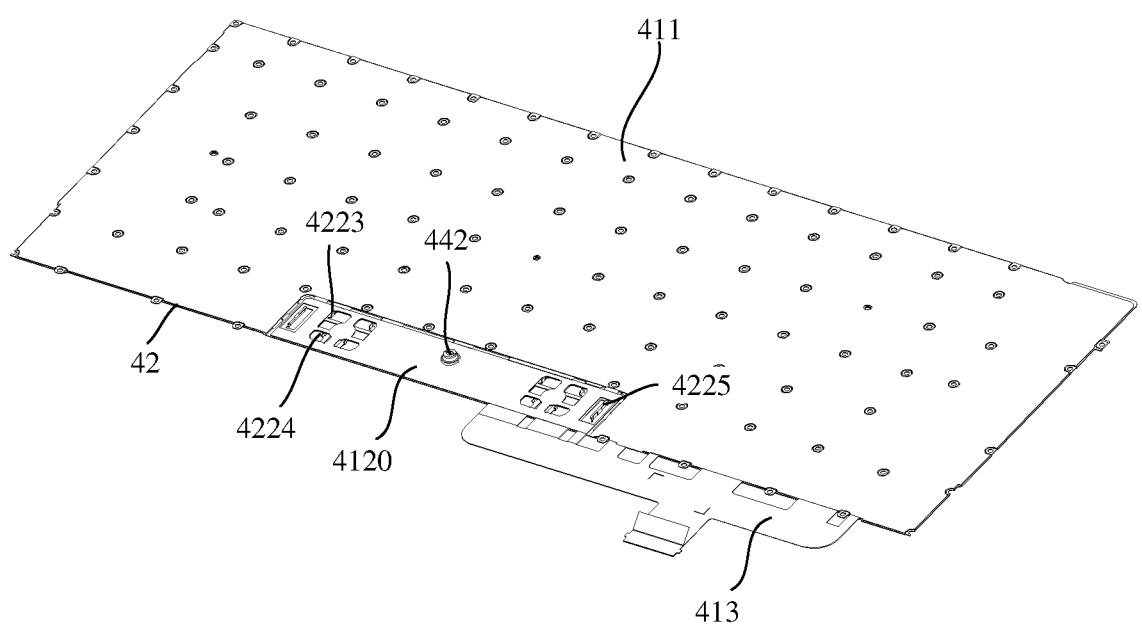
FIG. 19 is a schematic structural diagram of a connection between a substrate and a bottom plate in a keyboard according to an embodiment of this application.

FIG. 19 shows a three-dimensional structure of the substrate shown in FIG. 14 fitting the bottom plate shown in FIG. 16. In an embodiment in which the connecting rib 4221 extends obliquely, if the vertical projection of the first bearing plate 4120 toward the side of the substrate 41 facing the second key 44 is equal to or larger than the cross-sectional area of the second bearing plate 4220 in the vertical direction, when the connecting plate 4121 extends vertically, there is a possibility of interference with the connecting ribs 4221 obliquely extending. To avoid the interference between the connecting plate 4121 and the connecting rib 4221, in this embodiment, as shown in FIG. 19, the vertical projection of the first bearing plate 4120 toward the side of the substrate 41 facing the second key 44 may fall within the vertical projection of the second bearing plate 4220 toward a bottom of the side of the substrate 41 facing the second key 44. That is, the cross-sectional area of the first bearing plate 4120 in the vertical direction is smaller than the cross-sectional area of the second bearing plate 4220 in the vertical direction, so that the groove bottom area of the accommodating groove 420 is larger than the groove bottom area of the groove 410, the recess portion 412 can be accommodated in the accommodating groove 420, and when the recess portion 412 is accommodated in the accommodating groove 420, an outer wall of the recess portion 412 can be joined to the groove bottom of the accommodating groove 420.

In addition, when a plurality of connecting plates 4121 and a plurality of connecting ribs 4221 are provided, each connecting plate 4121 may be right opposite the gap 4222 between two adjacent connecting ribs 4221, to avoid interference between the connecting plate 4121 and the connecting rib 4221, or the connecting plates 4121 extends obliquely, and each connecting plate 4121 corresponds to a connecting rib 4221. Each connecting plate 4121 is suspended over a corresponding connecting rib 4221 in a thickness direction of the substrate 41, to avoid a case that the connecting plate 4121 is in contact with the connecting rib 4221 to cause interference.

Based on the foregoing embodiment, referring to FIG. 9, FIG. 15, FIG. 17, and FIG. 18, the keyboard 40 further includes a protective film 45. The protective film 45 is attached to a surface of the bottom plate 42 facing away from the substrate 41 to be connected to the bottom plate 42. The protective film 45 may be a polyethylene terephthalate (PET) film. The protective film 45 protects the keyboard 40. It may be understood that the protective film 45 is adapted to the shape of the bottom plate 42 to be joined to the surface of the bottom plate 42 facing away from the substrate 41. That is, when the surface of the bottom plate 42 facing away from the substrate 41 is planar, the protective film 45 is planar to be attached to the bottom plate 42. When the bottom plate 42 includes a protruding portion 422 protruding toward a side facing away from the substrate 41, a position at which the protective film 45 is attached to the protruding portion 422 protrudes from a position at which the protective film 45 is attached to the flat plate portion 421.

In addition, referring to FIG. 9 and FIG. 11, each first key 43 further includes a first scissor foot 431 arranged below the first key cap 430, one end of the first scissor foot 431 is rotatably connected to the bottom plate 42, and the other end of the first scissor foot 431 is rotatably connected to the first key cap 430. The first scissor foot 431 is made of a hard material such as metal or plastic, and the hard first scissor foot 431 has high structural strength and is used for providing good support for the first key cap 430, so that a force on the first key cap 430 is balanced, and the first key cap 430 located at any height can be pressed by a user with a fixed force. When the user presses the first key cap 430 downward, the first scissor foot 431 rotates in a direction toward the substrate 41. When the user releases the first key cap 430, the first key cap 430 moves upward, and the first scissor foot 431 rotates in a direction away from the substrate 41.

Referring to the figure, the first scissor foot 431 includes an outer scissor foot and an inner scissor foot. The outer scissor foot and the inner scissor foot are of a frame structure, and the inner scissor foot is rotatably connected to an inner portion of the outer scissor foot, so that the inner scissor foot is cross-connected to the outer scissor foot. One or more first scissor feet 431 may be provided. When one first scissor foot 431 is provided, the first scissor foot 431 is connected to the middle of the first key cap 430, and a first elastic member 432 may be mounted in the middle of a frame-type inner scissor foot.

Similarly, each second key 44 further includes a second scissor foot 441 arranged below the second key cap 440, one end of the second scissor foot 441 is rotatably connected to the bottom plate 42, and the other end of the second scissor foot 441 is rotatably connected to the second key cap 440. One or more second scissor feet 441 may be provided. For example, two second scissor feet 441 may be provided, and two second scissor feet 441 may be respectively rotatably connected to both ends of the second key cap 440, so that two ends of the second key cap 440 can be subjected to a force in a more balanced manner.

Figure 20:
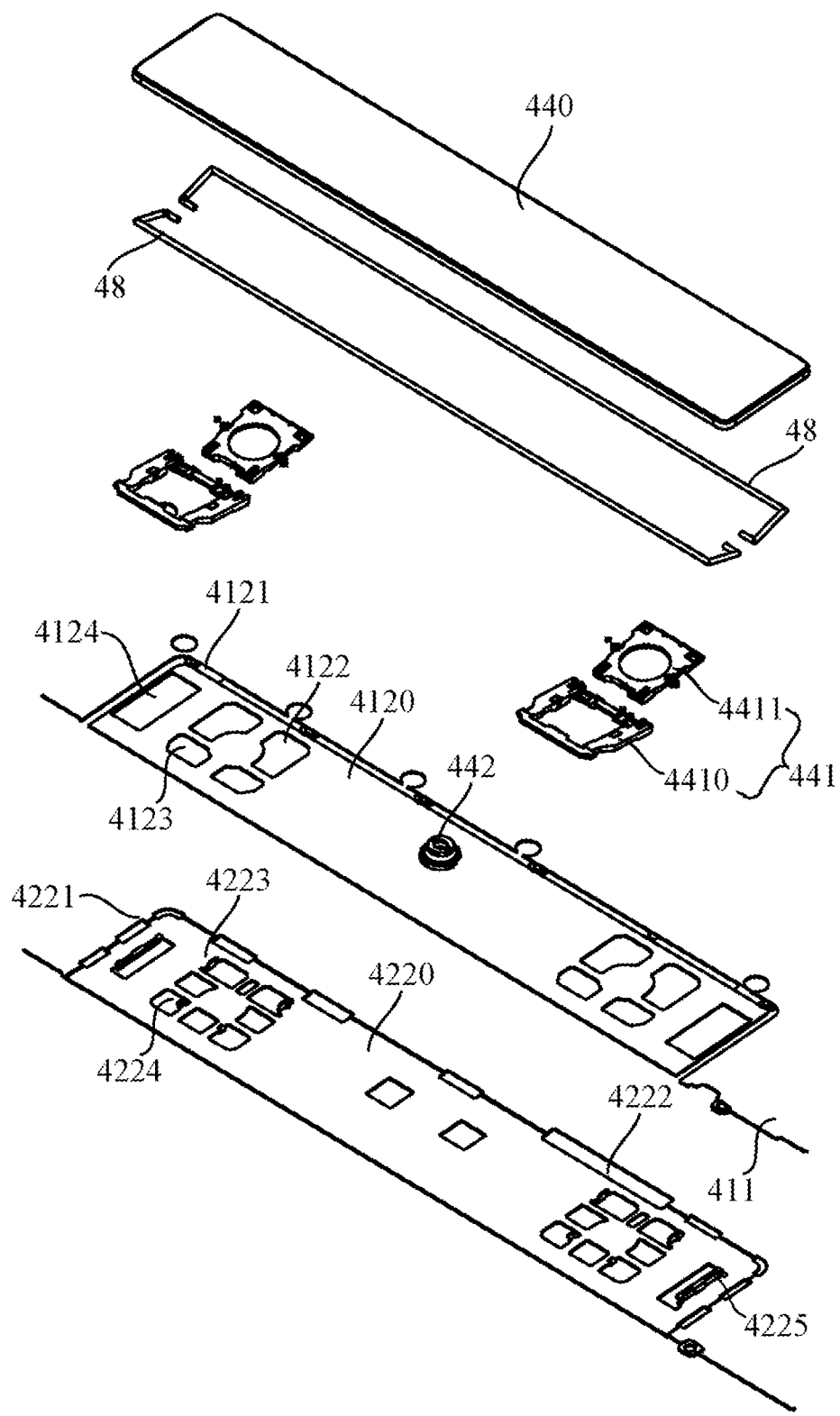
FIG. 20 is a schematic exploded view of a second key in a keyboard according to an embodiment of this application.

The structure and material of the second scissor foot 441 are respectively the same as those of the first scissor foot 431. That is, the second scissor foot 441 also includes an outer scissor foot 4410 and an inner scissor foot 4411 (see FIG. 20 below) that are cross-connected together. In addition, a connection method of the first scissor foot 431 is similar to that of the second scissor foot 441. In the following embodiment, only the second scissor foot 441, the bottom plate 42, and the second key cap 440 are used as an example for detailed description. After reading the following technical solution, those skilled in the art can obviously understand connections among the first scissor foot 431, the bottom plate 42, and the first key cap 430. Therefore, details are not described again in this embodiment FIG. 20 schematically shows an exploded structure at the second key 44 on the keyboard 40. For example, in FIG. 20, a specific implementation in which the inner scissor foot 4411 of the second scissor foot 441 is rotatably connected to the bottom plate 42 and the second key cap 440 is as follows: A first hook 4223 is arranged at a position corresponding to the second key cap 440 on the bottom plate 42. A first opening 4122 is provided in the first bearing plate 4120 of the substrate 41. The first hook 4223 can be exposed from the first opening 4122. A first rotary shaft is arranged at one end of the inner scissor foot 4411. The first rotary shaft rotatably fits the first hook 4223. In addition, a first sliding groove is formed in a surface of the second key cap 440 facing the substrate 41. A first sliding shaft is arranged at the other end of the inner scissor foot 4411. The first sliding shaft fits the first sliding groove in a sliding manner.

Similarly, a specific implementation in which the outer scissor foot 4410 of the second scissor foot 441 is rotatably connected to the bottom plate 42 and the second key cap 440 is as follows: A second hook 4224 is arranged at a position corresponding to the second key cap 440 on the bottom plate 42. A second opening 4123 is provided in the first bearing plate 4120 of the substrate 41. The second hook 4224 can be exposed from the second opening 4123. A second sliding shaft is arranged at one end of the outer scissor foot 4410. The second sliding shaft fits the second hook 4224 in a sliding manner. In addition, a hinge hole is further formed in a surface of the second key cap 440 facing the substrate 41. A second rotary shaft is arranged at the other end of the outer scissor foot 4410. The second rotary shaft is rotatably connected to the hinge hole.

In this way, when the second key 44 is pressed, the second key cap 440 moves downward. The first rotary shaft of the inner scissor foot 4411 rotates. Correspondingly, the first sliding shaft of the inner scissor foot 4411 slides in the first sliding groove in a direction away from the outer scissor foot 4410. The second rotary shaft of the outer scissor foot 4410 rotates in the hinge hole, and correspondingly, the second sliding shaft of the outer scissor foot 4410 slides in the second sliding groove in a direction away from the inner scissor foot 4411, so that the other end of the inner scissor foot 4411 and the other end of the outer scissor foot 4410 move downward, and the second key cap 440 moves downward.

It should be noted that, when a corner end of the second key 44 is pressed, because the second scissor foot 441 is a transmission structure, the second scissor foot 441 cannot implement support. Therefore, the second key cap 440 that only depends on the support of the second elastic member 442 may be considered as a simply supported beam.

Referring to FIG. 20, the keyboard 40 may further include at least one balance bar 48. The balance bar 48 is arranged between the second key cap 440 and the substrate 41. FIG. 20 shows an example in which two balance bars 48 are arranged between the second key cap 440 and the substrate 41.

At least two assembly grooves 4225 are provided in the bottom plate 42, and at least two avoidance openings 4124 are provided in the substrate 41. Each avoidance opening 4124 is right opposite to an assembly groove 4225, and the size of the assembly groove 4225 is larger than the size of the avoidance opening 4124, so that each assembly groove 4225 can be exposed from the substrate 41 through the avoidance opening 4124. Each balance bar 48 extends in a length direction of the second key cap 440, and both ends of each balance bar 48 are respectively rotatably connected to an assembly groove 4225, so that each balance bar 48 can rotate around an axis parallel to the length direction of the second key cap 440. In addition, each balance bar 48 is further rotatably connected to the second key cap 440. Through the foregoing arrangement, the balance bar 48 can support the second key cap 440, which helps to reduce a deformation degree of the second key cap 440, thereby facilitating helping to reduce a risk that the second key cannot implement an input successfully due to a deformation.

In the descriptions of the embodiments of this application, it should be noted that, unless expressly stated and defined otherwise, the terms "mounting", "connected", "connection", or the like are to be construed broadly, for example, as a fixed connection, an indirect connection through an intermediary, or internal communication between two elements or mutual interaction relationship between two elements. A person of ordinary skill in the art may understand the specific meanings of the foregoing terms in the embodiments of this application according to specific situations.

In the embodiments of this application, it is implied that an apparatus or element in question needs to have a particular orientation, or needs to be constructed and operated in a particular orientation, and therefore cannot be construed as a limitation on the embodiments of this application. In the description of the embodiments of this application, unless otherwise exactly and specifically ruled, "a plurality of" means two or more than two.

In the specification of the embodiments of this application, claims, and accompanying drawings, the terms "first", "second", "third", "fourth", and so on (if existing) are intended to distinguish between similar objects but do not necessarily indicate a specific order or sequence.

What is claimed is:

1. A keyboard, comprising: a substrate, and a plurality of first keys and at least one second key retractably arranged on the substrate, wherein
    a length of the second key is greater than a length of each first key, and a groove for each second key to extend into when being pressed is provided in the substrate at a position right opposite to the second key; and
    when the first key and the second key are in an initial state, a vertical distance between the second key and a groove bottom of the groove is greater than a vertical distance between the first key and the substrate, and a depth of the groove is greater than or equal to a maximum deformation deflection of the second key.

2. The keyboard according to claim 1, wherein a groove depth of the groove—is greater than or equal to 0.15 mm and less than or equal to 0.255 mm.

3. An electronic device, comprising: the keyboard according to claim 1.

4. The keyboard according to claim 1, wherein each first key comprises a first key cap, each second key comprises a second key cap, and a length of the second key cap is greater than a length of the first key cap;
    the second key cap is opposite to the groove, and an orthographic projection area of the second key cap towards the groove is smaller than a surface area of a notch carved into the groove, to allow the second key cap to extend into the groove when being pressed; and
    a vertical distance between the second key cap and the groove bottom of the groove is greater than a vertical distance between the first key cap and the substrate.

5. The keyboard according to claim 4, further comprising: a first elastic member and a second elastic member, wherein a height of the first elastic member is less than a height of the second elastic member;
    both ends of the first elastic member respectively abut against the substrate and the first key cap, and the first key cap is retractably arranged on the substrate by the first elastic member; and
    both ends of the second elastic member respectively abut against the groove bottom of the groove and the second key cap, and the second key cap is retractably arranged on the substrate-by the second elastic member.

6. The keyboard according to claim 4, further comprising: a bottom plate, connected to the substrate, wherein the bottom plate is located on one side of the substrate and the first key and the second key are located on an other side of the substrate.

7. The keyboard according to claim 6, further comprising: a protective film, wherein the protective film is attached to a surface of the bottom plate facing away from the substrate.

8. The keyboard according to claim 6, further comprising: at least one balance bar, wherein the balance bar is arranged between the second key cap and the substrate; and
assembly grooves corresponding to both ends of the balance bar are provided in the bottom plate, and avoidance openings for avoiding the assembly grooves are provided in the substrate, both ends of each balance bar are respectively rotatably connected to the assembly grooves, and the balance bar is rotatably connected to the second key cap.

9. The keyboard according to claim 6, wherein the substrate comprises a first surface and a second surface facing away from the first surface, the groove is provided in the first surface, and a distance between the groove bottom of the groove and the second surface is less than a distance between the first surface and the second surface; and
the bottom plate is connected to the second surface of the substrate.

10. The keyboard according to claim 6, wherein the substrate comprises a body portion and a recess portion connected to the body portion and protruding toward the bottom plate, and an inner wall of the recess portion defines the groove; and
an accommodating groove is provided in the bottom plate, and the recess portion is located in the accommodating groove.

11. The keyboard according to claim 10, wherein a surface of the bottom plate facing away from the substrate is a plane, and a thickness of the bottom plate at the accommodating groove is less than a thickness of a position of the bottom plate corresponding to the body portion.

12. The keyboard according to claim 10, wherein the bottom plate comprises a flat plate portion and a protruding portion that are connected, the protruding portion protrudes in a direction away from the substrate, and the flat plate portion and the protruding portion jointly define the accommodating groove.

13. The keyboard according to claim 12, wherein
the recess portion comprises a first bearing plate and a plurality of connecting plates, an opening is provided in the body portion, one end of each of the plurality of connecting plates is connected to an inner wall of the opening, and an other end of each of the plurality of connecting plates extends in a direction toward the bottom plate and is connected to the first bearing plate; and
the protruding portion comprises a second bearing plate and a plurality of connecting ribs, the plurality of connecting ribs are arranged at a circumferential edge of the second bearing plate, and the plurality of connecting ribs extend toward the flat plate portion and are connected to the flat plate portion;
the plurality of connecting ribs are spaced apart around the circumferential edge of the second bearing plate;
the plurality of connecting plates are spaced apart along a circumferential edge of the first bearing plate; and
each of the plurality of connecting plates is located between two adjacent connecting ribs; or the connecting plate is inclined to a first surface of the substrate, a vertical projection area of the first bearing plate-toward the second bearing plate is smaller than a cross-sectional area of the second bearing plate in a vertical direction, and each of the plurality of connecting plates is located on a side of the connecting rib facing the second key.

14. The keyboard according to claim 12, wherein
the recess portion comprises a first bearing plate and a connecting plate, an opening is provided in the body portion, one end of the connecting plate is connected to an inner wall of the opening, and an other end of the connecting plate extends in a direction toward the bottom plate and is connected to the first bearing plate; and
the protruding portion comprises a second bearing plate and a connecting rib, the connecting rib is arranged at a circumferential edge of the second bearing plate, and the connecting rib extends toward the flat plate portion and is connected to the flat plate portion.

15. The keyboard according to claim 14, wherein the connecting rib is inclined to a surface of the flat plate portion facing the substrate, and a groove bottom area of the accommodating groove is smaller than a surface area of a notch carved into the accommodating groove.

16. The keyboard according to claim 14, wherein the substrate further comprises a flexible circuit board, the opening is provided at an edge position of the body portion, the flexible circuit board is connected to an edge of a side in which the opening in the body portion is located, and the body portion is electrically connected to the recess portion by the flexible circuit board.

* * * * *

UNITED STATES PATENT AND TRADEMARK OFFICE
CERTIFICATE OF CORRECTION

| | | |
|---|---|---|
| PATENT NO. | : 12,327,697 B2 | Page 1 of 1 |
| APPLICATION NO. | : 18/252430 | |
| DATED | : June 10, 2025 | |
| INVENTOR(S) | : Haitao Li | |

It is certified that error appears in the above-identified patent and that said Letters Patent is hereby corrected as shown below:

On the Title Page

Change "(71) Applicant: HONOR DEVICE CO., LTD., Guangdong (CN)" to "(71) Applicant: HONOR DEVICE CO., LTD., Shenzhen (CN)".

Signed and Sealed this
Fifteenth Day of July, 2025

Coke Morgan Stewart
*Acting Director of the United States Patent and Trademark Office*